United States Patent
Jang et al.

(10) Patent No.: US 11,969,978 B2
(45) Date of Patent: Apr. 30, 2024

(54) FILM, FILM MANUFACTURING METHOD, COVER FILM, AND MULTILAYER ELECTRONIC EQUIPMENT

(71) Applicants: SK microworks Co., Ltd., Suwon-si (KR); ARKEMA FRANCE, Colombes (FR)

(72) Inventors: Kwangho Jang, Seoul (KR); Kweonhyung Han, Suwon-si (KR); Jinwoo Park, Seoul (KR); Atsushi Yoshitake, Kyoto (JP); Sebastien Merzlic, Serquigny (FR)

(73) Assignees: SK microworks Co., Ltd., Suwon-si (KR); Arkema France, Colombes (FR)

( * ) Notice: Subject to any disclaimer, the term of this patent is extended or adjusted under 35 U.S.C. 154(b) by 0 days.

(21) Appl. No.: 17/785,593

(22) PCT Filed: Dec. 28, 2020

(86) PCT No.: PCT/KR2020/019212
§ 371 (c)(1),
(2) Date: Apr. 12, 2023

(87) PCT Pub. No.: WO2021/153914
PCT Pub. Date: Aug. 5, 2021

(65) Prior Publication Data
US 2023/0241875 A1 Aug. 3, 2023

(30) Foreign Application Priority Data

Jan. 30, 2020 (KR) .................. 10-2020-0011176
Oct. 21, 2020 (KR) .................. 10-2020-0136899

(51) Int. Cl.
*B32B 27/36* (2006.01)
*B32B 7/12* (2006.01)
(Continued)

(52) U.S. Cl.
CPC ............... *B32B 27/36* (2013.01); *B32B 7/12* (2013.01); *B32B 27/34* (2013.01); *B32B 27/40* (2013.01);
(Continued)

(58) Field of Classification Search
None
See application file for complete search history.

(56) References Cited

U.S. PATENT DOCUMENTS

2009/0324884 A1* 12/2009 Nishi .................. B29C 55/023
428/137
2016/0137421 A1 5/2016 Josserond et al.
(Continued)

FOREIGN PATENT DOCUMENTS

CN 101472975 A 7/2009
CN 105431363 B 6/2017
(Continued)

*Primary Examiner* — Eli D. Strah
(74) *Attorney, Agent, or Firm* — NSIP Law

(57) ABSTRACT

A film, a manufacturing method of the film, a cover film, and a multi-layered electronic device include an elastic layer having a storage modulus index $K_{SM}$ of 20 to 350 Mpa represented by Equation 1 below and a haze of 3% or less, thereby providing the film having substantially low storage modulus variations over a wide temperature range, with good mechanical properties such as excellent elastic recovery force and good optical properties such as low haze, and provide the cover film or the multi-layered electronic device including the same.

$$K_{SM} = \left(\frac{SM_{-40} \times SM_{80}}{SM_{20}}\right) - SM_{80} \quad \text{[Equation 1]}$$

(Continued)

Where $SM_n$ is a storage modulus (Mpa) measured at a temperature of n° C.

17 Claims, 3 Drawing Sheets

(51) Int. Cl.
    *B32B 27/34*     (2006.01)
    *B32B 27/40*     (2006.01)

(52) U.S. Cl.
    CPC ..... *B32B 2307/306* (2013.01); *B32B 2307/51* (2013.01); *B32B 2307/538* (2013.01); *B32B 2457/20* (2013.01)

(56) References Cited

U.S. PATENT DOCUMENTS

| | | | |
|---|---|---|---|
| 2017/0227702 A1* | 8/2017 | Sherman | G02B 6/0018 |
| 2018/0063980 A1 | 3/2018 | Shin et al. | |
| 2018/0223092 A1 | 8/2018 | Degroot et al. | |
| 2019/0315105 A1 | 10/2019 | Isojima et al. | |
| 2023/0097930 A1* | 3/2023 | Jang | B32B 27/08 428/141 |

FOREIGN PATENT DOCUMENTS

| | | | | |
|---|---|---|---|---|
| CN | 107949476 A | | 4/2018 | |
| JP | 2013-242988 A | | 12/2013 | |
| JP | 2017-524559 A | | 8/2017 | |
| JP | 2019-99626 A | | 6/2019 | |
| JP | 2019-206705 A | | 12/2019 | |
| KR | 10-2011-0041507 A | | 4/2011 | |
| KR | 10-2016-0053788 A | | 5/2016 | |
| KR | 20160053788 A | * | 5/2016 | |
| KR | 10-1730854 B1 | | 4/2017 | |
| KR | 10-2017-0044068 A | | 6/2017 | |
| KR | 10-2017-0100407 A | | 9/2017 | |
| KR | 10-2019-0058491 A | | 5/2019 | |
| KR | 10-2019-0085778 A | | 7/2019 | |
| KR | 10-2019-0128991 A | | 11/2019 | |
| TW | 201031525 A1 | | 9/2010 | |
| WO | WO 2007/145324 A1 | | 12/2007 | |
| WO | WO-2019131752 A1 | * | 7/2019 | ......... B29C 48/0018 |
| WO | WO-2021108174 A1 | * | 6/2021 | ............ B32B 25/08 |

\* cited by examiner

[Fig.1]
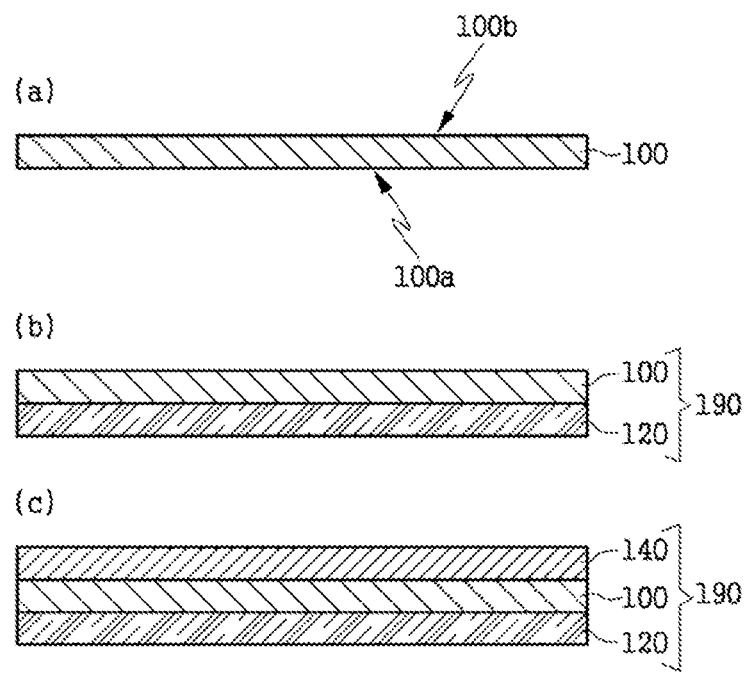
[Fig.2]
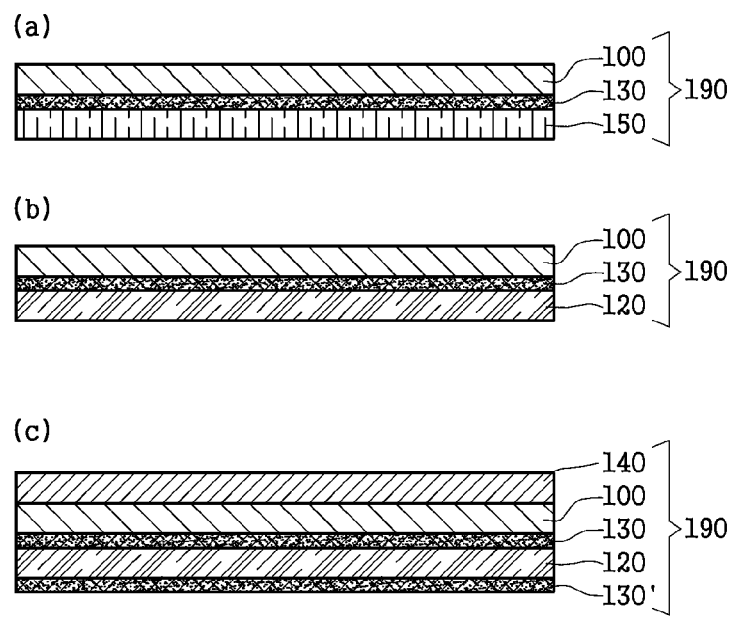

[Fig.3]
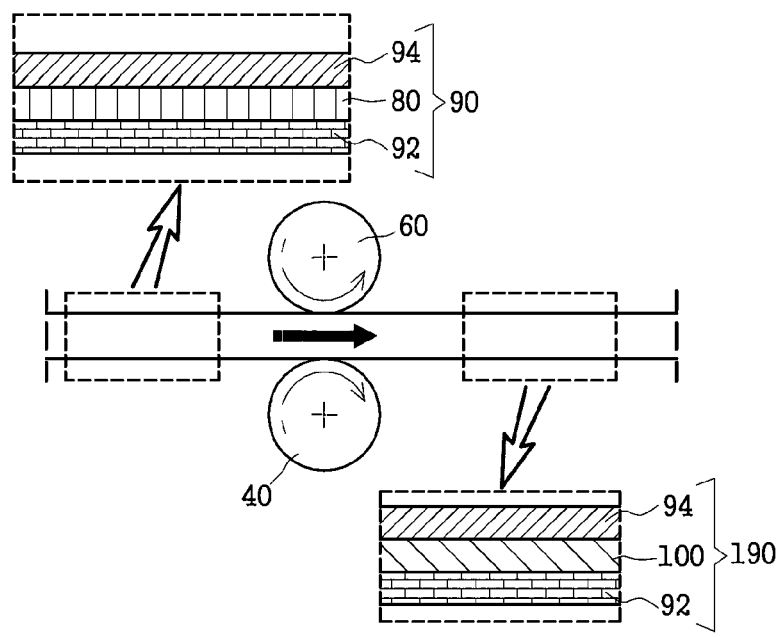
[Fig.4]
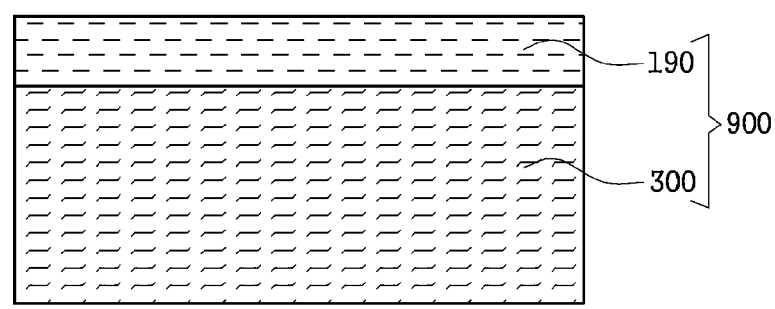

[Fig.5]
(a)
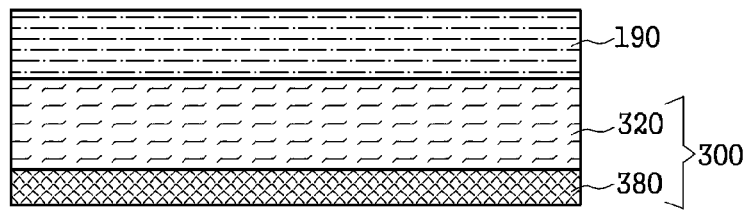
(b)
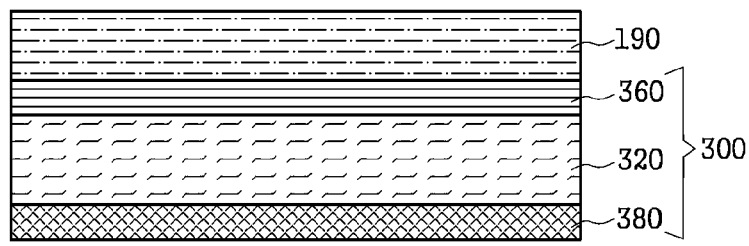
(c)
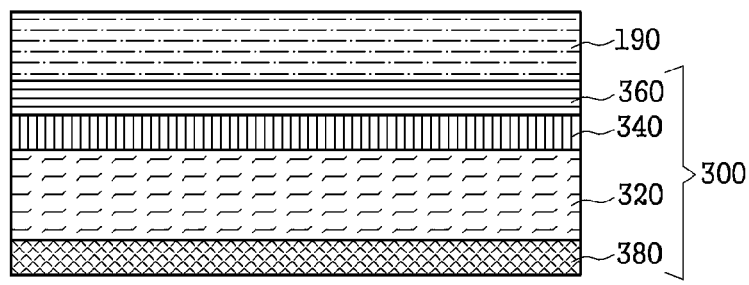
[Fig.6]
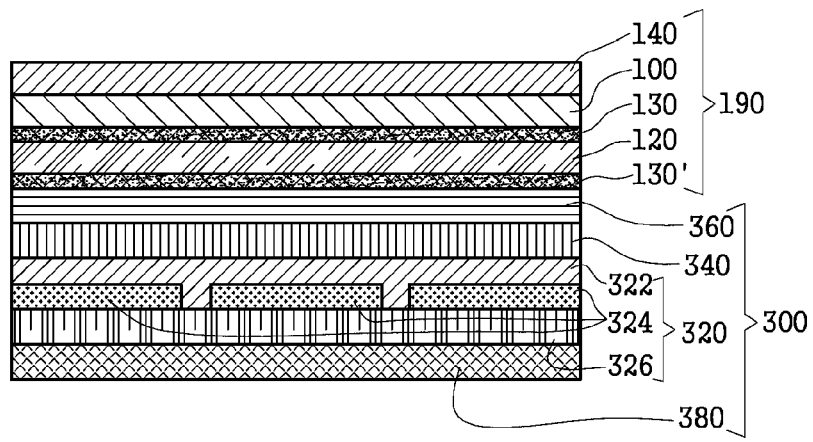

FILM, FILM MANUFACTURING METHOD, COVER FILM, AND MULTILAYER ELECTRONIC EQUIPMENT

TECHNICAL FIELD

The present disclosure relates to films, manufacturing methods of the films, cover films, multi-layered electronic devices and the like having good mechanical properties such as excellent elastic recovery force and substantially low storage modulus variations over a wide temperature range, good optical properties such as low haze, and the like.

BACKGROUND ART

The forms of display devices are diversified, and the required functions are changing, and the evolution to a wider screen, a thinner and more functional form is in progress. Since the form of the display has evolved from the conventional flat form to the curved form, it has been changed into a foldable, bendable, flexible, and the like. In other words, in recent years, the form of the display is changing to a form different from the existing one that simply evolved toward large area in that it can be changed in form such as folding or bending.

PET films having excellent properties such as mechanical properties, chemical resistance, and moisture barrier properties are widely used as film for display screen protection. Examples thereof include a polyester protective film (Korean Registration No. 10-1730854) that can be applied as a protective film of a polarizing plate with improved optical properties, and a protective film (Korean Registration No. 10-1746170) applicable to a touch panel. However, PET film may not satisfy the characteristics required in the curved surface or the bent portion due to the high modulus, which may be one of the causes of the film floating in a multi-layer display device.

In addition, PET film has limitations in performing enough protective functions because of its weak shock-relief characteristics compared to the rigid glass previously used to protect display modules of display devices mounted on portable electronic devices.

The above-described background technology is technical information possessed by the inventors to derive embodiments of the present invention or acquired in the process and is not necessarily known technology disclosed to the general public before the present disclosure.

DETAILED DESCRIPTION OF THE INVENTION

Technical Problem

It is an object of one embodiment to provide a film having substantially low storage modulus variations over a wide temperature range, with good mechanical properties such as excellent elastic recovery force and good optical properties such as low haze, and a manufacturing method of the film.

It is an object of another embodiment to provide a cover film having substantially low storage modulus variations over a wide temperature range, with good mechanical properties such as excellent elastic recovery force, in which separation of layers does not occur substantially thereby being advantageous to apply as a cover window of a multi-layered electronic device.

It is an object of another embodiment to provide uses of the film as cover windows such as foldable display, bendable display, flexible display, and the like.

It is an object of another embodiment to provide a multi-layered electronic device including the cover film with excellent optical properties, in which separation between layers does not occur even when repetitive bending or rolling was performed, having characteristics being strong on impact from an external.

It is an object of another embodiment to provide uses of the film described above as cover films applied in multi-layered electronic devices.

Technical Solution

The film, which is an embodiment to solve the above problems, includes an elastic layer.

The elastic layer may have a storage modulus index $K_{SM}$ of 20 to 350 Mpa represented by Equation 1 below.

$$K_{SM} = \left(\frac{SM_{-40} \times SM_{80}}{SM_{20}}\right) - SM_{80} \quad \text{[Equation 1]}$$

Where $SM_n$ is a storage modulus (Mpa) measured at a temperature of n° C.

The elastic layer may have a recovery force index Rv of greater than 50 represented by Equation 2 below.

$$Rv = \left(\frac{X_{2\%} - Xf}{X_{2\%} - Xo}\right) \times 100 \quad \text{[Equation 2]}$$

Where Xo is a length (mm) of the initial elastic layer, $X_{2\%}$ is a length (mm) of the elastic layer after 2% length stretching, and when 1 cycle is defined as a process consisting of 2% length stretching at a rate of 50 mm/min and restoring to original length at a rate of 50 mm/min, Xf is a length (mm) of the elastic layer after 100 cycles.

The elastic layer may have a haze of 3% or less.

The elastic layer may have a storage modulus of 3 GPa or less at ambient temperature.

The elastic layer may have a storage modulus ratio of 0.08 or more at 80° C. based on a storage modulus at 20° C.

The elastic layer may have a difference of a storage modulus at −40° C. and a storage modulus at 20° C., and the difference may range from −1500 to +1500 MPa.

The elastic layer may have a storage modulus of 20 to 2500 Mpa at 0° C.

The elastic layer may have a storage modulus of at least 5 Mpa or more at 80° C.

The elastic layer may have a thickness of less than 2000 μm.

A roughness reference value is a larger value between Ra1 and Ra2, and the Ra1 is a surface roughness Ra of one surface and Ra2 is a surface roughness Ra of the other surface.

The elastic layer may have a roughness reference value of 0.5 μm or less.

The film or the elastic layer may have a value of 2 or less obtained by subtracting the yellow index (Y.I) measured before exposure, from the Y.I measured after being exposed to ultraviolet of 280 to 360 nm at a power of 3.0 W for 72 hours.

The elastic layer may include a polymer including an amide residue as a repeating unit.

The elastic layer may include a polyamide, a polyether block amide (PEBA), a thermoplastic polyurethane (TPU), a copolyetherester (COPE), or a mixture thereof.

The elastic layer may have an impact strength of at least 2500 kJ/m² or more.

The elastic layer may have an absorbed energy of at least 1.4 J or more.

The elastic layer may be disposed on a heat-resisting layer.

The heat-resisting layer may include a polyimide layer or a glass layer.

The heat-resisting layer may have a haze of 3% or less.

The film further may include at least an adhesive layer disposed in one side or both sides of the heat-resisting layer.

The adhesive layer may have a difference of a storage modulus at −40° C. and a storage modulus at 80° C., and the difference of storage modulus may range from −100 to +100 kPa.

The film may be the one which does not come off even after dynamic folding test of 200 thousand times under the condition of the radius of curvature of 2 mm and the folding frequency of 2 sec/time.

The film may have an impact strength of at least 2500 kJ/m² or more.

The film may have an absorbed energy of at least 1.4 J or more.

A manufacturing method of the film according to embodiments, includes the steps of: forming an elastic sheet from a polymer resin including an amide or a residue thereof as a repeating unit; and passing a first assembly in which the elastic sheet is disposed on a carrier film, between rollers, thereby preparing a second assembly including the elastic layer disposed on the carrier film. The film described above is manufactured by the method above.

The surface in contact with the elastic sheet of the carrier film may have a surface roughness of 0.01 μm or less.

A cover film according to embodiments includes the film described above.

A multi-layered electronic device according to embodiments includes the cover film described above.

The multi-layered electronic device may include a light emitting function layer and the cover film.

The light emitting function layer may have a display area which emits or does not emit light depending on a signal from an external.

The cover film may be disposed on one side of the lighting emitting function area and covers at least a part of the display area.

Effects of the Invention

The film, manufacturing method of the film, and the like of the embodiments may provide a film having substantially low storage modulus variations over a wide temperature range, with good mechanical properties such as excellent elastic recovery force and good optical properties such as low haze, and may provide efficient manufacturing method of the film.

The cover film, multi-layered electronic device, and the like including the film of the embodiments may provide a cover film having characteristics of excellent bending and rolling even in a wide temperature range, with excellent elastic recovery force, inhibitory effect for impair from external impact and good optical properties such as low haze, and may provide a multi-layered electronic device including the same.

BRIEF DESCRIPTION OF DRAWINGS

FIG. 1 shows conceptual views of (a), (b) and (c) illustrating the film with sections, respectively, according to embodiments.

FIG. 2 shows conceptual views of (a), (b) and (c) illustrating the film with sections, respectively, according to embodiments.

FIG. 3 is a conceptual view illustrating a manufacturing method of the film.

FIG. 4 is a conceptual view illustrating a composition of a multi-layered electronic device with a section, according to embodiments.

FIG. 5 shows conceptual views of (a), (b) and (c) illustrating compositions of multi-layered electronic devices with sections, respectively, according to embodiments.

FIG. 6 is a conceptual view illustrating a composition of a multi-layered electronic device with a section, according to embodiments.

MODE FOR CARRYING OUT THE INVENTION

Hereinafter, embodiments of the present disclosure will be described in detail such that they can easily be made by those skilled in the art to which the present disclosure pertains. The present disclosure may, however, be embodied in many different forms and should not be construed as limited to exemplary embodiments set forth herein. Like reference numerals indicate like elements throughout the specification and drawings.

In the present specification, the phrase that a certain component "comprises" another component means that the certain component may further include one or more components but does not preclude the presence or addition of one or more other components, unless specifically stated to the contrary.

In the present specification, the phrase that a certain component is "connected" to another component includes not only 'directly connected' but also 'connected having other intervening components therebetween'.

In the present specification, I will be understood that when "B" is referred to as being on "A", ""B" can be directly on "A" or intervening other component(s) may be present therebetween. That is, the location of "B" is not construed as being limited to direct contact of "B" with the surface of "A".

In the present specification, the term "combination of" included in Markush type description means mixtures or combinations of one or more elements described in Markush type and thereby means that the disclosure includes one or more elements selected from the Markush group.

In the present specification, the description of "A and/or B" means "A, or B, or A and B."

In the present specification, the terms such as "first", "second" or "A", "B" are used to distinguish the same terms from each other, unless specifically stated otherwise.

In the present specification, the singular forms "a" "an" and "the" are intended to include the plural forms as well, unless context clearly indicates otherwise.

In the present specification, storage modulus is described based on the measurement of storage modulus (E') by applying TA instruments' DMA Q800 model in accordance with ASTM D4065. The apparatus is described based on the results of measuring the storage modulus (E') in Mpa units at a temperature range (−40 to 80° C.) by applying 1 Hz and 2° C./min in DMA (Dynamic Mechanical Analysis) tension mode.

In the present specification, letters and/or numbers written in combination with the name of the compound mean an abbreviation for the name of the compound.

In the present specification, relative size, thickness, and the like of the components showed in drawings may be presented with exaggeration for easy description.

Hereinafter, the example embodiments will be described in more detail.

The inventors of the example embodiments experimentally verified that haze values and the like of elastic layers might have large variation depending on the manufacturing process, even when the manufacture of the elastic layers of film form with same thickness was performed applying a polymer resin. The inventors also experimentally verified that difference in optical properties such as haze value was generated depending on the manufacturing process even when applied with the same polymer resin. The inventors manufactured the film of which optical properties, modulus quality and the like are all excellent, applicable for a display area of a multi-layered electronic device which includes a cover window of foldable or rolling display. Description about the same will now be made specifically.

(a), (b) and (c) of FIG. 1 are conceptual views illustrating the film with sections, respectively, according to embodiments. (a), (b) and (c) of FIG. 2 are conceptual views illustrating the film with sections, respectively, according to embodiments. FIG. 3 is a conceptual view illustrating a manufacturing method of the film. Referring to FIG. 1 to FIG. 3, an elastic layer included in a film, the film, and a manufacturing method of the film is described.

In general aspect, the film 190 according to one embodiment comprises an elastic layer 100.

Elastic Layer 100

An elastic layer 100 has excellent optical properties.

The elastic layer 100 may have a haze of 3% or less, or 2% or less. The elastic layer may have a haze of 1.5% or less, or 1.2% or less. The elastic layer may have a haze of 0.01% or more, or 0.1% or more. When the elastic layer has the haze same as above, it is good for applying to a display area of a display device.

The elastic layer 100 may have a transmittance of visible light of 85% or more, 88% or more, or 90% or more. The elastic layer may have a transmittance of visible light of 99.99% or less. The elastic layer 100 or the film 190 comprising the same is advantageous for applying to an electronic device as a protective layer (or a cover window).

The elastic layer 100 may have the optical properties described above and characteristics related to storage modulus described below.

The elastic layer 100 has a storage modulus index of 20 to 350 MPa represented by Equation 1 below.

$$K_{SM} = \left(\frac{SM_{-40} \times SM_{80}}{SM_{20}}\right) - SM_{80} \quad \text{[Equation 1]}$$

Where $K_{SM}$ is storage modulus index of the elastic layer, and $SM_n$ is a storage modulus (Mpa) of the elastic layer measured at a temperature of n° C.

For example, $SM_{-40}$ is the storage modulus (Mpa) of the elastic layer measured at −40° C., $SM_{20}$ is the storage modulus (Mpa) of the elastic layer measured at 20° C., and $SM_{80}$ is the storage modulus (Mpa) of the elastic layer measured at 80° C.

When the elastic layer has a storage modulus index in the values mentioned above, the elastic layer has a relatively stable storage modulus change in a comparatively wide temperature range, and so the elastic layer can have stable elastic qualities in a wide temperature range.

The elastic layer 100 may have a storage modulus of 3 GPa or less at room temperature or ambient temperature. The elastic layer may have a storage modulus of 2 GPa or less at room temperature or ambient temperature. In the present specification, room temperature is based on about 20° C., and ambient temperature is based on about 25° C.

The elastic layer 100 has a characteristic that the storage modulus value is relatively low at room temperature or ambient temperature compared to PET film. In this feature, the elastic layer or the film including the same may thereby have more stable bending qualities and may further alleviate the impact transmitted from an external to the equipment placed on the other side of the elastic layer or the film.

The elastic layer 100 may have a high temperature storage modulus ratio $R_{80/20}$ of 0.08 or more. The high temperature storage modulus ratio $R_{80/20}$ is a ratio of storage modulus at 80° C. based on the storage modulus at 20° C. and is represented by Equation 1-a below.

$$R_{80/20} = \frac{SM_{80}}{SM_{20}} \quad \text{[Equation 1-a]}$$

Where $R_{80/20}$ is a high temperature storage modulus ratio, and $SM_n$ is a storage modulus (Mpa) of the elastic layer measured at a temperature of n° C.

The elastic layer 100 may have a $R_{80/20}$ of 0.08 or more, 0.10 or more, or 0.15 or more. The elastic layer may have a $R_{80/20}$ of 0.20 or more, or 0.25 or more. The elastic layer may have a $R_{80/20}$ of 1 or less, or 0.85 or less. The elastic layer may have a $R_{80/20}$ of 0.7 or less, or 0.55 or less.

The elastic layer having $R_{80/20}$ in this range is advantageous for applying as bendable cover window to which successive bending is performed in a wide temperature range. These characteristics are more useful when the elastic layer is laminated with another layer. Specifically, applying the elastic layer having the above characteristics enables relatively easy control to degradation of material properties caused from the storage modulus difference depending on temperature between each layer. In addition, the elastic layer has excellent elastic qualities that are controllable even in a range of high temperature as well as at room temperature or ambient temperature.

The elastic layer 100 may have a $R_{80/20}$ of 0.15 to 0.55. The elastic layer may have a $R_{80/20}$ of 0.25 to 0.55. In this case, even after the bonding of the elastic layer and the other composition using the adhesive layer and the like has stable properties of the elastic layer. It is possible to substantially control the occurrence of delaminating phenomenon, floating phenomenon, etc. at high temperature as well as at ambient temperature.

The elastic layer 100 may have a low temperature storage modulus ratio $R_{-40/20}$ of 1.15 or more. The low temperature storage modulus ratio $R_{-40/20}$ is a ratio of the storage modulus at −40° C. based on the storage modulus at 20° C. and is represented by Equation 1-b below.

$$R_{-40/20} = \frac{SM_{-40}}{SM_{20}} \quad \text{[Equation 1-b]}$$

Where $R_{-40/20}$ is a low temperature storage modulus ratio, $SM_n$ is a storage modulus (Mpa) of the elastic layer measured at a temperature of n° C.

The elastic layer 100 may have an $R_{-40/20}$ of 1.20 or more, or 1.33 or more. The elastic layer may have an $R_{-40/20}$ of 20 or less, or 10 or less. The elastic layer may have an $R_{-40/20}$ of 4.9 or less, or 4.5 or less.

The elastic layer having $R_{-40/20}$ in this range is advantageous for applying as bendable cover window to which successive bending is performed in a wide temperature range. These characteristics are more useful when the elastic layer is laminated with another layer. Specifically, applying the elastic layer having the above characteristics enables relatively easy control to degradation of material properties caused from the storage modulus difference depending on temperature between each layer. In addition, the elastic layer has excellent elastic qualities that are controllable even in a range of high temperature as well as at room temperature or ambient temperature.

The elastic layer 100 may have an $R_{-40/20}$ of 1.22 to 4.50. The elastic layer may have an $R_{-40/20}$ of 1.22 to 3.8. The elastic layer may have an $R_{-40/20}$ of 1.22 to 3.0. In this case, even after the bonding of the elastic layer and the other composition using the adhesive layer and the like may have stable properties of the elastic layer. It is possible to substantially control the occurrence of peeling phenomenon, floating phenomenon, etc. at low temperature as well as at ambient temperature.

The low temperature storage modulus difference is a difference between a storage modulus at 20° C. and a storage modulus at −40° C. and is represented by Equation 1-c below.

$$D_{-40\text{-}20} = SM_{-40} - SM_{20} \qquad \text{[Equation 1-c]}$$

Where $D_{-40\text{-}20}$ is a low temperature storage modulus difference, $SM_n$ is a storage modulus (Mpa) of the elastic layer measured at a temperature of n° C.

The elastic layer 100 may have a $D_{-40\text{-}20}$ of −1500 MPa to 1500 MPa. The elastic layer may have a $D_{-40\text{-}20}$ of −1000 MPa to 1000 MPa. When the $D_{-40\text{-}20}$ of the elastic layer is more than 1500 MPa, the difference in storage modulus at room temperature and at low temperature is relatively large, and thus the elastic property may be substantially insufficient at low temperature, irreversible deformation such as cracks and tearing may occur due to deformation such as bending. Preferably, $D_{-40\text{-}20}$ of the elastic layer may be less than 1000 MPa.

The elastic layer 100 may have a storage modulus of 2300 Mpa or less, or 2000 Mpa or less at −40° C. The elastic layer may have a storage modulus of 200 Mpa or more, 400 Mpa or more or 500 Mpa or more at −40° C.

The elastic layer 100 may have a storage modulus of 2500 Mpa or less, or 2000 MPa or less at 0° C. The elastic layer may have a storage modulus of 20 Mpa or more, or 150 MPa or more at 0° C. The elastic layer may have a storage modulus of 180 to 1200 MPa at 0° C.

The elastic layer 100 may have a storage modulus of 10 Mpa or more, or 90 Mpa or more at 40° C. The elastic layer may have a storage modulus of 3000 MPa or less, or 2000 MPa or less at 40° C. The elastic layer may have a storage modulus of 100 to 1200 MPa at 40° C.

The elastic layer 100 may have a storage modulus of 4 MPa or more, or 20 MPa or more at 80° C. The elastic layer may have a storage modulus of 2000 MPa or less, or 1000 MPa or less at 80° C. The elastic layer may have a storage modulus of 40 to 950 MPa, or 60 to 350 MPa at 80° C.

The elastic layer 100 may have a difference of a storage modulus at −40° C. and a storage modulus at 20° C., and the difference of a storage modulus may range from −1000 to +1000 MPa. The difference is a value for convenience obtained by subtracting a small value from a large value and may be represented as absolute value, in this time, the difference may be 1000 MPa. The elastic layer having the above characteristics has a relatively small storage modulus difference in a wide temperature range from high temperature to low temperature, and thus can exhibit stable storage modulus characteristics in a wide temperature range.

The elastic layer 100 with the above-described storage modulus characteristics by each temperature has a suitable storage modulus value and/or a degree of change, at not only room temperature or ambient temperature but also in a wide temperature range from low temperature to high temperature.

The elastic layer 100 can adequately protect equipment from external impacts when applied to the equipment (multi-layered electronic device, etc.) by alone or with other layers due to its excellent recovery characteristic, which restore the original form even after repetitive transformations like bending or rolling.

The elastic layer 100 may have a recovery force index Rv of greater than 50 represented by Equation 2 below.

$$Rv = \left(\frac{X_{2\%} - Xf}{X_{2\%} - Xo}\right) \times 100 \qquad \text{[Equation 2]}$$

Where Xo is the length (mm) of the initial elastic layer, $X_{2\%}$ is a length (mm) of the elastic layer after 2% length stretching, and Xf is a length (mm) of the elastic layer after 100 cycles when 1 cycle is defined as a process consisting of 2% length stretching at a rate of 50 mm/min and restoring to original length at a rate of 50 mm/min.

In the test of the recovery force index, fixing parts such as jigs for fixing the elastic layer are applied to both ends of the elastic layer. Because the length of the initial elastic layer and the length of the elastic layer after the cycle mean a length in which the tension has been repeated, Xo and Xf mentioned above are the length of elastic layer between the fixing portions, respectively.

The Rv of the elastic layer 100 may be 55 or more, 60 or more, or 68 or more. The Rv of the elastic layer may be less than 100, or may be 99 or less. The Rv of the elastic layer may be 95 or less, or 90 or less.

When Rv of the elastic layer 100 is in the range mentioned above, the elastic layer may have excellent recovery characteristic even after repeated stretching. In particular, even if the stretching-recovery is repeated in a relatively short length, like bending, the elastic layer has elastic recovery durability which can substantially maintain the properties and length of the initial elastic layer.

The Rv value of the elastic layer is based on a result of evaluating the elastic layer in the form of a film having a thickness of 100 μm by fixing it to a fixing part (eg, a jig) of the evaluation apparatus alone without applying a separate carrier film or support layer but is not limited thereto, and the measured value obtained by an evaluation recognized as equivalent can be also approved as Rv value.

The elastic layer 100 may have an impact strength of 2500 kJ/m² or more, an impact strength of 3500 kJ/m² or more, or an impact strength of 4500 kJ/m² or more. The elastic layer 100 may have an impact strength of 5000 kJ/m² or more, or an impact strength of 10000 kJ/m² or less. The elastic layer having these characteristics is useful for a cover film because it absorbs an impact from an external well and is not easily broken or impaired.

The elastic layer 100 may have an absorbed energy of 1.4 J or more, or an absorbed energy of 1.5 J or more. The elastic layer 100 may have an absorbed energy of 1.6 J or more, or an absorbed energy of 2.0 J or less. The elastic layer having these characteristics is useful for a cover film because it absorbs well an impact from an external and alleviates the impact being transmitted to an internal, so that protect the film itself to be not easily impaired.

The impact strength and the absorbed energy are based on the result from evaluation of tensile-impact strength in the elastic layer in accordance with JIS K 7160 standard, respectively, and specific measuring conditions are based on conditions presented in experiment example embodiment described below.

The elastic layer 100 may be in the form of a film in which the thickness is controlled to be constant.

The elastic layer 100 may be in the form of an extruded film in which the thickness is controlled to be constant.

The elastic layer may be laminated with other layers described below so that comprised in a laminated film.

In the above, the term "thickness is controlled to be constant" means having a thickness adjusted to a range of −5% to +5% of the predetermined thickness.

The elastic layer 100 is in the form of a film and may have a thickness of less than 2000 μm. The elastic layer may have a thickness of 1500 μm or less, or 1000 μm or less. The elastic layer may have a thickness of 1 μm or more. The elastic layer may have a thickness of 50 μm to 300 μm.

The elastic layer 100 in the form of a film having the thickness as described above has the storage modulus characteristics described above and also has excellent optical properties, so that, it is suitable for use as a cover film of a display device.

The surface of elastic layer 100 has a low surface roughness of a predetermined level or less.

Surface roughness of the elastic layer may have a technical meaning by itself, but be related to other properties like optical properties thus affect material properties of the elastic layer such as optical properties. The inventors verified that the surface roughness of the elastic layer was able to affect to maintain the optical properties, in particular, haze properties of the film below a certain level.

A roughness reference value is a larger value between Ra1 and Ra2, and the Ra1 is a surface roughness Ra of one surface and Ra2 is a surface roughness Ra of the other surface.

The roughness reference value of the elastic layer 100 is 0.5 μm or less

The roughness reference value of the elastic layer may be less than 0.5 μm, 0.2 μm or less, or 0.1 μm or less. The roughness reference value of the elastic layer may be greater than 0 μm, 0.0001 μm or more, or 0.001 μm or more.

When the roughness reference value of the elastic layer is controlled to a certain level or less, the optical properties of the elastic layer, in particular, haze properties may be further improved.

The roughness reference value of the elastic layer 100 may be 0.001 to 0.1 μm. The roughness reference value of the elastic layer may be 0.0015 to 0.05 μm. The elastic layer having such a roughness reference value has better optical properties such as haze, and also has excellent utility as an optical film.

For example, one surface of the elastic layer is a surface in contact with a carrier film 92 described later, and the other surface of the elastic layer may be a surface in contact with a separate sheet-protecting film or a roll-type device (eg, a squeezing roll) in a manufacturing process.

The Ra1 and Ra2 may be controlled by adjusting surface roughness of a carrier film and a roll-type device (or a sheet-protecting film) in contact with one side or the other side of the elastic sheet, respectively, in manufacturing process of the elastic layer.

For example, if the surface roughness Ra of the carrier film is in a range of 0.8 to 1.2 μm, Ra1, which is a surface roughness Ra of one surface of the elastic layer, may be 0.8 to 1.2 μm.

For example, if the surface roughness Ra of the roll-type device is in a range of 0.01 to 0.5 μm, Ra2, which is a surface roughness Ra of the other surface of the elastic layer, may be in a range of 0.01 to 0.5 μm.

For example, if the surface roughness Ra of the sheet-protecting film is in a range of 0.01 to 0.5 μm, Ra2, which is a surface roughness Ra of the other surface of the elastic layer, may be in a range of 0.01 to 0.5 μm.

The carrier film 92 may be a polyethylene terephthalate (PET) film, but is not limited thereto.

The sheet-protecting film 94 may be a polyethylene (PE) film, but is not limited thereto.

The elastic layer 100 may have a shore D hardness of 20 to 75, specifically 30 to 70. It presents suitable hardness for applying as a cover film, and gives the film excellent impact resistance with elastic qualities.

The elastic layer 100 may have an inherent viscosity of 0.8 to 2.5 when measured at 25° C. with meta cresols in accordance with ISO 307:2019.

The elastic layer 100 may have a yellow index (Y.I) of 1 or less. The Y.I may be a value measured in YI E313 (D65/10) mode by applying a color meter ultra scanpro manufactured by Hunterlab.

The elastic layer 100 may have a value of 2 or less obtained by subtracting the Y.I measured before exposure, from the Y.I measured after being exposed to ultraviolet of 280 to 360 nm at a power of 3.0 W for 72 hours. The elastic layer may have a value of 1 or less obtained by subtracting the Y.I measured before exposure, from the Y.I measured after being exposed to ultraviolet of 280 to 360 nm at a power of 3.0 W for 72 hours. The elastic layer may have a value of 0.1 or more obtained by subtracting the Y.I measured before exposure, from the Y.I measured after being exposed to ultraviolet of 280 to 360 nm at a power of 3.0 W for 72 hours. The elastic layer having such characteristics may have excellent ultraviolet durability with little or no yellowing of the coating layer even when exposed to ultraviolet.

The elastic layer 100 may do not substantially generate cloudy phenomenon. Substantially, on the elastic layer cloudy phenomenon may be observed in only less than 1% area of a total area. In this case, a total area is based on the entire area of the film applied to products. The cloudy phenomenon may be objectified by measuring haze. When a measured haze value is greater than 1%, it may be considered that the cloudy phenomenon is perceivable. The cloudy phenomenon may be adjusted by controlling gelation and molecular weight distribution of the resin applied to the manufacture of the elastic layer.

The elastic layer 100 may have excellent durability as a result of dynamic folding test.

The dynamic folding test is performed in accordance with IEC 62715-6-1 standard, and the elastic layer is checked for cracks after dynamic folding test of 200 thousand times under the condition of the curvature radius of 2 mm and folding frequency of 2 sec/time at −40° C.

In accordance with IEC 62715-6-1 standard, the elastic layer 100 may have excellent durability that crack does not substantially occur in the elastic layer after dynamic folding test of 200 thousand times under the condition of the curvature radius of 2 mm and folding frequency of 2 sec/time at −40° C.

It means, considering the properties that elasticity in low temperature is relatively lower than elasticity in ambient temperature or high temperature, the elastic layer has excellent elastic qualities even in results of repetitive folding test in a wide temperature range.

The elastic layer 100 may comprise a polymer including an amide residue as a repeating unit.

The elastic layer 100 may be a plastic film including a polymer which has an amide residue as a repeating unit.

The elastic layer 100 may be an elastomer film comprising a polymer which has an amide residue as a repeating unit.

The content of the amide residue may be 50 wt % or more, or 60 wt % or more based on the entire polymer included in the elastic layer. The content of the amide residue may be 80 wt % or less, or 70 wt % or less based on the entire polymer included in the elastic layer. When the polymer having such characteristics is applied to the elastic layer, it may provide an elastic layer having better mechanical properties.

The content of the amide residue may be 92 to 97 mol % based on the entire polymer included in the elastic layer. When this polymer is applied to the elastic layer, it may provide an elastic layer having excellent strength and elastic qualities in a substantially wide range.

The elastic layer 100 comprises a polymer, and the polymer may comprise a rigid region and a soft region in the polymer chain.

The rigid region may be represented by a rigid segment or a semi-crystalline region. The soft region may be represented by a soft segment or an amorphous region.

The polymer comprises a rigid region and a soft region at the same time, and may enable the elastic layer to have a relatively strong mechanical strength and to have flexible and/or elastomeric properties, simultaneously.

The elastic layer may have a polymer chain region (homogeneous region) which includes monomers classified as the substantially same type. If degree of partial bonding or chain alignment of the polymer chain region (homogeneous region) is adjusted, the elastic layer can have both strength and elastic qualities that are intended. In the elastic layer, monomers classified as the substantially different type may be further bonded to the polymer chain region (homogeneous region). The elastic layer may have both a rigid region that is partially strong and a soft region that has partially soft properties so can give the polymer flexible qualities.

The elastic layer may include an elastic polyamide (long chain polyamide).

The elastic polyamide may include an amorphous region, which is a soft region, and may include a crystalline region, which is a rigid region. The amorphous region may be matrix, and the crystalline region may have a state distributed in the matrix.

The rigid region may include relatively more hydrogen-bonded C=O molecules as compared to the soft region. The soft region may include more free C=O bonds that are not hydrogen-bonded as compared to the rigid region. The content of hydrogen-bonded C=O molecules included in the rigid and soft regions can be confirmed by measuring FT-IR spectra.

An elastic polyamide may include a semicrystalline polyamide. The elastic polyamide may include an amorphous polyamide. The elastic polyamide may include a mixture of semicrystalline polyamides and amorphous polyamides. It is preferable to include more than 50 wt % semicrystalline polyamide based on the entire elastic polyamide for the elastic polyamide.

The elastic polyamide may be a homo polyamide, polyamide copolymer, or a mixture thereof. The elastic polyamide may be prepared into homo polyamide by polymerizing one kind of monomer selected from amino acids, lactams or mixtures of diacids and diamines. The elastic polyamide may be prepared into polyamide copolymers by polymerizing two or more monomers selected from amino acids, lactams or mixtures of diacids and diamines.

The elastic polyamide may be prepared by combining a molecule including an amide group at one end and another molecule including a carboxyl group located at one end.

Examples of the monomer applied to prepare the elastic polyamide are as follows but are not limited thereto.

The aliphatic diacid may be, for example, adipic acid (6), azelaic acid (9), sebacic acid (10), dodecanedioic acid (12), and the like, but is not limited thereto.

The aromatic diacid may be, for example, terephthalic acid (T), isophthalic acid (I), and the like, but is not limited thereto.

The aliphatic diamine may be, for example, butylenediamine (4), hexamethylene-diamine (6 or HMDA), isomers of trimethylhexamethylenediamine (TMHMDA), octamethylenediamine (8), decamethylenediamine (10), dodecamethylenediamine (12) and the like, but is not limited thereto.

The aromatic diamine may be, for example, meta-xylene-diamine (MXD), and the like, but is not limited thereto.

The cycloaliphatic diamine may be, for example, bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (BMACM, MACM or B), bis(p-aminocyclohexyl)methane (PACM), isopropylidenedi(cyclohexylamine) (PACP), isophoronediamine (IPD), 2,6-bis(aminomethyl)norbornane (BAMN), piperazine, or a mixture thereof, but is not limited thereto, Other diamines may be, for example, isophoronediamine (IPDA), 2,6-bis-(aminomethyl)norbornane (BAMN), and the like, but are not limited thereto.

The lactam may be, for example, caprolactam (L6), lauryllactam (L12), and the like, but is not limited thereto.

The amino acid may be, for example, 11-aminoundecanoic acid (11), 11-(N-heptyl-amino)undecanoic acid (NHAU), and the like, but It is not limited thereto.

The elastic polyamide may comprise aliphatic polyamide. The elastic polyamide may consist of aliphatic polyamide.

The elastic polyamide may comprise a semiaromatic polyamide. The elastic polyamide may consist of semiaromatic polyamide.

The aliphatic polyamide may be, for example, polycaprolactam (PA 6), polyundecanamide (PA 11), polylauryllactam (PA 12), polybutylene adipamide (PA 46), polyhexamethylene adipamide (PA 66), polyhexamethylene azelamide (PA 69), polyhexamethylene sebacamide (PA 610), polyhexamethylene dodecanediamide (PA 612), polydecamethylene dodecanediamide (PA 1012), polydecamethylene sebacamide (PA 1010), polydodecamethylene dodecanediamide (PA 1212), PA 11/NHUA, PA BACM6, PA BACM10, PA BACM12, PA 6/66, PA 6/12 as polyamide copolymers, or mixtures thereof, but is not limited thereto. According to an embodiment, the polyamide copolymer may be PA 6/66, PA 6/610, PA6/12, or mixtures thereof.

The semiaromatic polyamide may be, for example, PA 6/6T, PA 66/6T, PA 6T/61, PA 66/6T/61, PA 11/6T, PA 12/6T, PA MXD6, PA MXD10, or mixtures thereof, but is not limited thereto.

The amorphous polyamide may be, for example, polyhexamethylene isophthalamide (PA 61), polytrimethylhexamethylene terephthalamide (PA TMHMDAT), PA BACM12 as polyamides; PA 6/BMACPI, PA 6/BAMNT, PA 11/BMACMI, PA 11/BMACMT/BMACMI, PA 11/BACM.I/IPDA.I, PA 12/BMACM.I, PA 12/BACMT/BACMI, PA 12/BMACMT/BACMI, PA 12/BACMI/IPDAI, PA 6T/61/BACMI, PA 6T/61/BACMT/BACMI as amide copolymers; or mixtures thereof, but is not limited thereto.

Preferably, the polyamide is a semicrystalline polyamide. In the present specification, semicrystalline polyamide may substantially mean a linear aliphatic polyamide. Preferably, the semicrystalline polyamide may be one selected from PA 6, PA 11, PA 12, PA 10.10, PA 10.12, PA 6.10, PA 6.12, and a combination thereof.

The elastic polyamide may be, for example, Rilsan®, Rilsamid®, etc. manufactured by Arkema, but is not limited thereto.

The elastic layer 100 may comprise a polyether block amide (PEBA). The polyether block amide includes two phases: a polyamide region that is a rigid region and a polyether region that is a soft region. The polyamide region may have a melting point of about 80° C. or more, specifically about 130 to 180° C., thus may substantially compose a rigid region as a crystalline phase. The polyether region may have a glass transition temperature of about −40° C. or less, specifically in the low temperature range of −80 to −40° C., thus may substantially compose an amorphous soft region.

The polyether block amide may be the combined one of a polyamide and an ether, in which the polyamide includes 2 or more carboxyl groups in a molecule and the ether includes 2 or more hydroxyl group in a molecule.

The elastic layer 100 may comprise a polyether block amide, and the polyether block amide may comprise one or more copolymer including a polyether block and a polyamide block. The polyether block amide includes one or more polyether block and one or more polyamide block.

The copolymer (polyether block amide) including a polyether block and a polyamide block may be prepared by condensation polymerization of the polyether block including a reactive end and the polyamide block including a reactive end.

The polyether block amide may be a condensation polymer including a polyamide block and a polyalkylene block, wherein the polyamide block may include a diamine end, and the polyalkylene block may include a dicarboxylic end.

The polyether block amide may be a condensation polymer including a polyamide block and a polyether block, wherein the polyamide block may include a dicarboxyl end and the polyoxyalkylene block may include a diamine end. The polyoxyalkylene block may be obtained by cyanoethylation and hydrogenation of an aliphatic α, ω-dihydroxylated polyoxyalkylene block known as polyetherdiol.

The polyether block amide may be a condensation polymer including a polyamide block with a dicarboxyl end and a polyetherdiol block. In this case, the polyether block amide is polyetheresteramide.

For example, a polyamide block including dicarboxyl chain ends may include a condensation polymer of polyamide precursors in the presence of chain limiting dicarboxylic acids. For example, a polyamide block including diamine chain ends may be a condensation polymer of polyamide precursors in the presence of chain limiting diamines.

For example, a polyamide block including a dicarboxylic chain end may include a condensation polymer of α, ω-aminocarboxylic acid, lactam or dicarboxylic acid with diamine in the presence of chain limiting dicarboxylic acid. The polyamide block may be advantageously polyamide 12 or polyamide 6.

The polyether block amide may include a block having structure of randomly distributed units.

Advantageously, three types of polyamide blocks may be used.

As a first type, the polyamide block may include a condensation polymer of a carboxylic acid and an aliphatic or arylaliphatic diamine. The carboxyl acid may have 4 to 20 carbon atoms, and preferably 6 to 18 carbon atoms. The aliphatic or arylaliphatic diamine may have 2 to 20 carbon atoms, and preferably 6 to 14 carbon atoms.

The dicarboxylic acid may be, for example, 1,4-cyclohexanedicarboxylic acid, 1,2-cyclohexyldicarboxylic acid, 1,4-butanedioic acid, adipic acid, azelaic acid, suberic acid, sebacic acid, 1,12-dodecanedicarboxylic acid, 1,14-tetradecanedicarboxylic acid, 1,18-octadecanedicarboxylic acid, terephthalic acid, isophthalic acid, haphthalenedicarboxylic acid, dimerized fatty acid, and the like.

The diamines may be, for example, 1,5-tetramethylenediamine, 1,6-hexamethylenediamine, 1,10-decamethylenediamine, 1,12-dodecamethylenediamine, trimethyl-1,6-hexamethylenediamine, 2-methyl-1,5-pentamethylenediamine, the isomers of bis (3-methyl-4-aminocyclohexyl) methan (BMACM), 2,2-bis (3-methyl-4-aminocyclohexyl) propane (BMACP), bis (para-aminocyclohexyl) methane (PACM), isophoronediamine (IPD), 2,6-bis (aminomethyl) norbornane (BAMN), piperazine (Pip), meta-xylylenediamine (MXD), para-xylylenediamine (PXD), and the like.

Advantageously, a first type of the polyamide block may include PA 412, PA 414, PA 418, PA 610, PA 612, PA 614, PA 618, PA 912, PA 1010, PA 1012, PA 1014, PA 1018, MXD6, PXD6, MXD10, or PXD10.

A second type of the polyamide block in which dicarboxylic acid or diamine having 4 to 12 carbon atoms is contained, may include a condensation polymer of one or more α, ω-aminocarboxylic acid and/or one or more lactam having 6 to 12 carbon atoms.

The lactams may be, for example, caprolactam, oenantholactam, lauryllactam and the like.

The α, ω-aminocarboxylic acid may be, for example, aminocaproic acid, 7-aminoheptanoic acid, 11-aminoundecanoic acid, 12-aminododecanoic acid, and the like.

Advantageously, the second type of the polyamide block may include polyamide 11, polyamide 12 or polyamide 6.

A third type of the polyamide block may include a condensation polymer of one or more α, ω-aminocarboxylic acids (or one or more lactams), one or more diamines and one or more dicarboxylic acids.

In this case, the polyamide PA block may be prepared by condensation polymerization of a diamine, a diacid and a comonomer (or comonomers) as below.

The diamine may be, for example, a linear aliphatic diamine, an aromatic diamine, a diamine having X carbon atoms, and the like. The diacid may be, for example, dicarboxylic acid, an acid having Y carbon atoms, and the like. The comonomer or comonomers {Z} may be selected from the lactam and the w-aminocarboxylic acid having Z carbon atoms, and a substantially equimolar mixture including at least one diamine having X1 carbon atoms and at least one dicarboxylic acid having Y1 carbon atoms. However, the (X1, Y1) is different from (X, Y).

The comonomer or comonomers {Z} may be included with 50 wt % or less, preferably 20 wt % or less, advantageously 10 wt % or less, based on an entire combined polyamide precursor monomer.

The condensation reaction according to the third type may proceed in the presence of a chain limiting agent selected from dicarboxylic acids.

Advantageously, the dicarboxylic acid having Y carbon atoms may be used as chain limiting agent, and the dicarboxylic acid may be introduced in a stoichiometrically excessive amount compared to an amount of the one or more diamine.

As an alternative form of the third type, the polyamide block in which the chain limiting agent is contained, may optionally include two or more kinds of α, ω-aminocarboxylic acids having 6 to 12 carbon atoms, or two or more kinds of lactams having 6 to 12 carbon atoms, or a condensation polymer of a lactam and an aminocarboxylic acid each having different number of carbon atoms.

The aliphatic α, ω-aminocarboxylic acid may be, for example, aminocaproic acid, 7-aminoheptanoic acid, 11-aminoundecanoic acid, 12-aminododecane, and the like.

The lactams may be, for example, caprolactam, oenantholactam, lauryllactam and the like.

The aliphatic diamine may be, for example, hexamethylene diamine, dodecamethylene diamine, trimethylhexamethylene diamine, and the like.

The cycloaliphatic diacid may be, for example, 1,4-cyclohexanedicarboxylic acid.

The aliphatic diacid may be, for example, butanedioic acid, adipic acid, azelaic acid, suberic acid, sebacic acid, dodecanedicarboxylic acid, dimer fatty acids (preferably at least 98% or more dimer ratio; preferably hydrogenated; Available under the trade name Pripol from Uniqema or trade name Empol from Henkel), polyoxyalkylene-α, ω-diacid, and the like.

The aromatic diacid may be, for example, terephthalic acid (T) and isophthalic acid (I), and the like.

The cycloaliphatic diamine may be, for example, bis(3-methyl aminocyclohexyl)methane (BMACM), isomers of 2,2-bis(3-methyl aminocyclohexyl)propane (BMACP), and bis(para-Aminocyclohexyl)methane (PACM), and the like.

Other diamines may be, for example, isophoronediamine (IPD), 2,6-bis(aminomethyl)novonane (BAMN) and piperazine, and the like.

The aryl aliphatic diamine may be, for example, meta-xylylenediamine (MXD) and para-xylylene diamine (PXD), and the like.

Examples of the third type polyamide block may be, for example, PA 66/6, PA 66/610/11/12, and the like.

In the PA 66/6, 66 represents a hexamethylenediamine unit condensed with adipic acid, and 6 represents a unit introduced by condensation of caprolactam.

In the PA 66/610/11/12, 66 represents a hexamethylenediamine unit condensed with adipic acid, 610 represents a hexamethylenediamine unit condensed with sebacic acid, 11 represents a unit introduced by condensation of aminoundecanoic acid, and 12 represents a unit introduced by condensation of lauryllactam.

The number average molar mass (Mn) of the polyamide block may be 400 to 20000 g/mol, preferably 500 to 10000 g/mol.

For example, the polyether block (PE) is preferably selected from one or more polyalkylene ether polyols, in particular, polyethylene glycol (PEG), polypropylene glycol (PPG), polytrimethylene glycol (PO3G), polytetramethylene glycol (PTMG), mixtures thereof or copolymers thereof, as polyalkylene ether diols. The polyether block may contain a polyoxyalkylene sequence including the $NH_2$ chain end and the sequence may be introduced by cyanoacetylation of an aliphatic α, ω-dihydroxy polyoxyalkylene sequence known as polyetherdiol. Specifically, Jeffamine (eg, Jeffamine® D400, D2000, ED2003 or XTJ542 manufactured by Huntsman) may be used.

The at least one polyether block preferably includes, for example, a polyalkylene ether polyol such as PEG, PPG, PO3G, PTMG, a polyether including NH2 at the chain end with including a polyoxyalkylene sequence, copolymers in which they are randomly arranged and/or block arranged (ether copolymers), and at least one polyether selected from mixtures thereof.

The polyether block may be included 10 to 80 wt %, preferably 20 to 60 wt %, preferably 20 to 40 wt %, based on the total weight of the copolymer.

The number average molecular weight of the polyether block may be 200 to 1000 g/mol (excluding limits), preferably 400 to 800 g/mol (including limits), preferably 500 to 700 g/mol.

The polyether block may be introduced from polyethylene glycol. The polyether block may be introduced from polypropylene glycol. The polyether block may be produced from polytetramethylene glycol. The polyether block may be copolymerized with polyamide blocks including carboxyl ends to form polyether block amides. The polyether block may be aminated to be converted to polyetherdiamine, and then condensed with a polyamide block including carboxyl end to form a polyether block amide. The polyether block may be mixed with polyamide precursors and chain limiting agent to form polyether block amides having statistically distributed units.

The polyether includes, for example, polyethylene glycol (PEG), polypropylene glycol (PPG) or polytetramethylene glycol (PTMG), and the like. The polytetramethylene glycol is also known as polytetrahydrofuran (PTHF). Whether polyether block may be introduced into the chain of polyether block amides in the form of diols or diamines, for simplicity the polyether blocks are referred to as PEG blocks, PPG blocks or PTMG blocks, respectively.

Even if the polyether block includes units other than units derived from ethylene glycol ($—OC_2H_4—$), propylene glycol ($—O—CH_2—CH(CH_3)—$), or tetramethylene glycol ($—O—(CH_2)_4—$), the polyether block does not depart from the scope of the present embodiments.

The number average molar mass of the polyamide block may be advantageously 300 to 15,000, preferably 600 to 5000. The number average molar mass of the polyether block may be 100 to 6000, preferably 200 to 3000.

Advantageously, the content of polyamide contained in the polyether block amide may be at least 50 wt % or more based on the total polyether block amide. This may also mean the possibility of statistical distribution in the polymer chain. The content of the polyamide is preferably 50 to 80 wt %. The content of the polyether contained in the polyether block amide is preferably 20 to 50 wt % based on the total polyether block amide.

Preferably, the polyamide block and the polyether block in the copolymer may have a number average molar mass ratio of 1:0.25 to 1, and the number average molar mass of polyamide block and the polyether block in the copolymer may be 1000/1000, 1300/650, 2000/1000, 2600/650 or 4000/1000, respectively.

The preparing method of polyether block amide may include a first step of preparing a polyamide block and a polyether block, and a second step of preparing an elastic polyether block amide by condensation polymerization of the prepared polyamide block and a polyether block. The polyether block amide may be prepared by condensation polymerization of monomers in a single step.

The polyether block amide may have, for example, a Shore D hardness of 20 to 75, advantageously 30 to 70. The polyether block amide has an intrinsic viscosity of 0.8 to 2.5, as measured by meta-cresol at 25° C. The intrinsic viscosity is measured according to ISO 307: 2019. In detail, the intrinsic viscosity measurement in solution is measured in a 0.5 wt % meta-cresol solution relative to the total solution at 25° C. using a Ubbelohde viscometer.

The polyether block amides may be, for example, PEBAX®, Pebax® Rnew® manufactured by Arkema, and VESTAMID® E manufactured by Evonik, but are not limited thereto.

The elastic layer 100 may include a thermoplastic polyurethane (TPU), and a copolymer of a polyurethane block (PU) and a polyether block (PE), also called as polyetherurethane.

TPU may be a condensation polymer including soft PE blocks such as polyether diols or polyester diols (e.g., poly(butyladipate), polycarpolactonediol) and hard PU blocks. The PU block and the PE block may be connected by a combination derived from the reaction of the isocyanate group of the polyether and the hydroxyl group of the polyetherdiol.

In the present specification, the polyurethane means a product prepared by the reaction of at least one diisocyanate selected from aromatic diisocyanates (eg MDI, TDI) and/or aliphatic diisocyanates (eg HDI or hexamethylenediisocyanate) with at least one diol having short chain length (eg butanediol, ethylene glycol).

The elastic layer may include a polyetherester copolymer (COPE).

COPE may include at least one polyether block (PE) and at least one polyester block (homopolymer or ester copolymer).

COPE may include a flexible PE block derived from polyetherdiol, a rigid polyester block derived from reaction with at least one dicarboxylic acid and at least one short chain extender diol unit. The PES block and the PE block may be connected by an ester bond introduced by the reaction of the acid of dicarboxylic acid and the hydroxyl group of polyetherdiol. The short chain extender diol may be selected from the group consisting of neopentyl glycol and aliphatic glycols of the formula $HO(CH_2)_nOH$, wherein n is an integer from 2 to 10.

While polyether chains and diacid chains form flexible blocks, diacid chains and glycol or butanediol chains form hard polyetherester copolymer hard blocks. Advantageously, the diacid is an aromatic dicarboxylic acid having 8 to 14 carbon atoms. Aromatic dicarboxylic acid may be replaced with one or more other aromatic dicarboxylic acids having 8 to 14 carbon atoms within 50 mole % of the whole of the aromatic dicarboxylic acid. Aromatic dicarboxylic acid may be replaced with aliphatic dicarboxylic acid having 2 to 14 carbon atoms within 20 mol % of a total aromatic dicarboxylic acid.

The aromatic dicarboxylic acid may be, for example, terephthalic acid, isophthalic acid, bibenzoic acid, naphthalene dicarboxylic acid, 4,4-diphenylenedicarboxylic acid, bis(p-carboxyphenyl)methane acid, ethylene bis(p-benzoic acid), 1,4-tetramethylene bis(p-oxybenzoic acid), ethylene bis(p-oxybenzoic acid), 1,3-trimethylene bis(p-oxybenzoic acid), and the like.

Examples of glycols may be ethylene glycol, 1,3-trimethylene glycol, 1,4-tetramethylene glycol, 1,6-hexamethylene glycol, 1,3-propylene glycol, 1,8-octamethylene glycol, 1,10-decamethylene glycol, and the like.

COPE may include, for example, a polyether unit derived from polyetherdiol such as polyethylene glycol (PEG), polypropylene glycol (PPG), polytrimethylene glycol (PO3G) or polytetramethylene glycol (PTMG), and polyester units introduced by the reaction of an dicarboxyl acid (eg terephthalic acid) with a glycol (eg ethanediol, 1,4-butanediol). The polyetherester copolymers are described in patents EP402883 and EP405227 and the entire disclosure of which is incorporated herein by reference for all purposes.

The elastic layer may include the polyamide, the PEBA, the TPU, the COPE, or a mixture thereof.

The method of manufacturing an elastic layer using a polymer resin is mentioned later.

Film 190, Use of the Film 190

The film 190 according to another embodiment includes an elastic layer 100.

Detailed description of the elastic layer 100 is the same as described above, and omitted to avoid duplication.

The film 190 may further include a carrier film 92 located on the one surface 100a of the elastic layer.

The carrier film 92 may be a film having a thickness of 50 μm, and considering the various aspects such as chemical resistance and dimensional stability, PET film may be applied.

The carrier film 92 may be, for example, applied with a PET film of 50 to 250 μm.

The carrier film 92 may simultaneously function as a release film 150 described below.

One surface of the carrier film 92 may directly contact the elastic layer 100.

In the manufacturing process of the elastic layer 100, the surface roughness of one surface of the carrier film 92 may be transcribed to one surface of the elastic layer in contact with it.

Surface roughness Ra of one surface of the carrier film 92 may be 0.5 μm or less, or 0.2 μm or less. Surface roughness Ra of one surface of the carrier film 92 may be greater than 0 μm, may be 0.0001 μm or more, or may be 0.001 μm or more.

Surface roughness Ra of one surface of the carrier film 92 may be 0.001 to 0.1 μm. The carrier film having such roughness may provide an elastic layer having a lower haze value by controlling the surface roughness of the elastic layer.

The film 190 may include a film-laminate (film, 190) consisting of the elastic layer 100 and the carrier film 92. The carrier film may function as a release film.

The film 190 may further include a sheet-protecting film 94 placed on the other surface of the elastic layer.

The sheet-protecting film 94 may, for example, be applied with a PE film or a PET film. The thickness of the sheet-protecting film 94 is not particularly limited.

One surface of the sheet-protecting film 94 may be in direct contact with the other surface 100b of the elastic layer. When the sheet-protecting film is applied in the manufacturing process of the elastic layer, the surface roughness of one surface of the sheet-protecting film can control the surface roughness of the other surface of the elastic layer.

Surface roughness Ra of one surface of the sheet-protecting film 94 may be 0.5 µm or less, or 0.2 µm or less. Surface roughness Ra of one surface of the sheet-protecting film 94 may be greater than 0 µm, 0.0001 µm or more, or 0.001 µm or more.

Surface roughness Ra of one surface of the sheet-protecting film may be 0.001 to 0.1 µm. The sheet-protecting film having such roughness may provide an elastic layer having a lower haze value by controlling the surface roughness of the elastic layer.

The film 190 may include a laminate consisting of an elastic layer 100 and a sheet-protecting film placed on the elastic layer.

The film 190 may include a laminate consisting of a carrier film 92, an elastic layer 100 placed on the carrier film, and a sheet-protecting film 94 placed on the elastic layer.

The film 190 may further include an adhesive layer 130 on one surface or the other surface of the elastic layer, if necessary.

The adhesive layer 130 may be an optical adhesive layer excellent in light transmittance and/or transparency. For example, a laminate including OCA (Optically Clear Adhesive), PSA (Pressure Sensitive Adhesive), or a mixture thereof may be applied.

The adhesive layer 130 may have a difference of a storage modulus at −40° C. and a storage modulus at 80° C., and the difference of storage modulus may range from −100 to 100 kPa, or from −80 to 80 kPa. The adhesive layer 130 may have a value obtained by subtracting a storage modulus at 80° C. from a storage modulus at −40° C., and the value may range from 0.01 to 100 kPa, from 0.1 to 80 kPa, or from 1 to 50 kPa. When the adhesive layer 130 having these characteristics of storage modulus is applied to the film 10, recovery force and recovery durability of the film may be further enhanced, particularly it is useful for applying as a cover of flexible or rollable displays.

The elastic layer 100 may be disposed on the release film 150. The adhesive layer may be disposed between the elastic layer and the release layer. In this time, the film 190 may be a laminate which is laminated with release film 150, an adhesive layer 130, and an elastic layer 100 in order.

The release film 150 may be, for example, a PET film, but is not limited thereto. In addition, the carrier film 92 or sheet-protecting film 94 described above may be applied as release film 150.

The elastic layer 100 may be disposed on the heat-resisting layer 120.

The film 190 may comprise the elastic layer 100 disposed on the heat-resisting layer 120.

The film 190 may comprise an adhesive layer 130 placed between the heat-resisting layer 120 and the elastic layer 100. The adhesive layer 130 may be the adhesive layer described above.

The film 190 may not include an adhesive layer as a separated layer between the elastic layer 100 and the heat-resisting layer 120. In this time, the elastic layer 100 may be attached on the heat-resisting layer 120 by method of melt adhesion.

The heat-resisting layer 120 may be a polyimide film, a glass layer, or a laminate thereof. The glass layer may be the one having heat-resistance and insulation, simultaneously in which the radius of curvature is small. For example, the glass layer may have a radius of curvature of 2 mm or less.

The polyimide film may be a layer prepared from a polyamide-imide polymer. The layer manufactured thereby includes an imide repeating unit, thus it may correspond to a polyimide film in a broad meaning.

The polyamide-imide polymer includes a polymer formed by polymerization of an aromatic diamine compound, an aromatic dianhydride compound and a dicarbonyl compound.

Specifically, the polyamide-imide polymer may be obtained by polymerization of an aromatic diamine compound, an aromatic dianhydride compound, and a dicarbonyl compound in an organic solvent.

The aromatic diamine compound may include 2,2'-bis (trifluoromethyl)-4,4'-diaminobiphenyl (TFMB), 2,2-bis (4-(4-aminophenoxy) phenyl) hexafluoropropane (HFBAPP), 4,4'-diamino-2,2'-bis (trifluoromethyl) diphenyl ether (BTFDPE), 2,2-bis (4-(4-amino trifluoromethyl) phenoxy) phenyl) hexafluoropropane (HFFAPP), or 3,5-diaminobenzotrifluoride (DATF).

Specifically the aromatic diamine compound may be a compound represented by Formula 1-1 below.

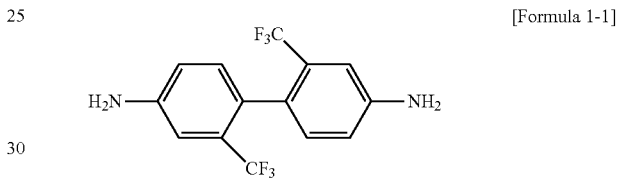

[Formula 1-1]

The aromatic dianhydride compound may include 2,2-bis (3,4-dicarboxyphenyl) hexafluoropropane dianhydride (6-FDA), 4,4'-oxydiphthalicanhydride (ODPA), or 2,3,3',4'-biphenyltetracarboxylic dianhydride (BPDA).

Specifically the aromatic dianhydride compound may be a compound represented by Formula 2-1 below.

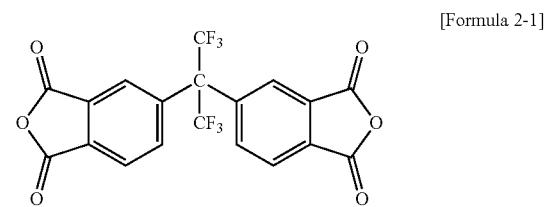 [SMILES: O=C1OC(=O)c2cc(C(c3ccc4c(c3)C(=O)OC4=O)(C(F)(F)F)C(F)(F)F)ccc21]

[Formula 2-1]

The aromatic diamine compound and the aromatic dianhydride compound may react in a mol ratio of 1:0.95 to 1.05 to form a polymer.

The dicarbonyl compound may be a compound represented by Formula 3-1 or Formula 3-2 below.

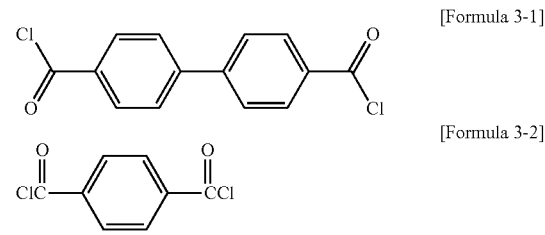

[Formula 3-1]

[Formula 3-2]

The aromatic diamine compound and the dicarbonyl compound may react in mol ratio of 1:0.95 to 1.05 to form a polymer.

The polyimide film may include at least one among the repeating units represented by Formula 4-1 to Formula 4-3 below.

[Formula 4-1]

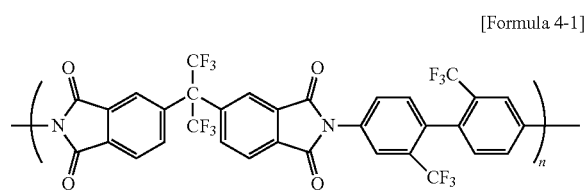

In the Formula 4-1, the n is an integer from 1 to 400.

[Formula 4-2]

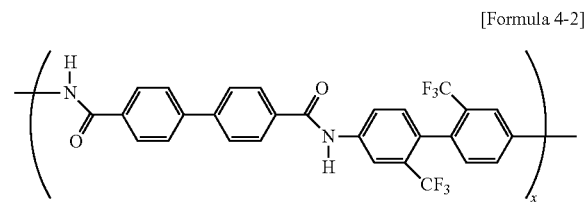

In the Formula 4-2, the x is an integer form 1 to 400.

[Formula 4-3]

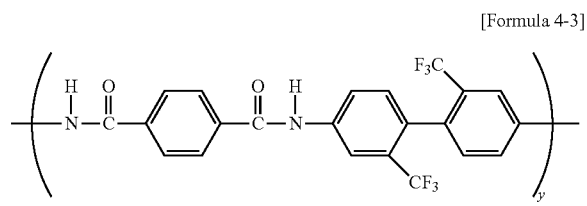

In the Formula 4-3, the y is an integer from 1 to 400.

The polyimide film may include an imide repeating unit and an amide repeating unit in a mol ratio of 1:1 to 4.

The polyimide film may have excellent transparence with the characteristics like excellent mechanical properties, chemical resistance, and heat resistance.

The polyimide film may have a modulus of 5.0 GPa or more, based on a thickness of 50 μm.

The polyimide film may have a surface hardness of HB or more.

The polyimide film may have a yellow index of 5 or less, based on a thickness of 50 μm.

The polyimide film may have a haze of 2% or less, based on a thickness of 50 μm.

The polyimide film may be a transparent polyimide film.

The polyimide film may have a light transmittance of 85% or more measured at 550 nm, based on a thickness of 50 μm.

The polyimide film may have a stretching strength of 15 kgf/mm$^2$ or more, based on a thickness of 50 μm.

The polyimide film may have an elongation of 15% or more based on a thickness of 50 μm.

The film 190 may further comprise an adhesive layer 130' disposed in counter of the elastic layer 100 having the heat-resisting layer 120 placed therebetween. Description about the adhesive layer 130' is same as above description about the adhesive layer 130, thus detailed description will be omitted.

The film 190 may further comprise an release film 150 disposed in counter of the heat-resisting layer 120 having the adhesive layer 130' placed therebetween. When the film further includes a release film, the process of adhesion with other layers can be performed more easily. Description about the release film is the same as above description, thus will be omitted.

The film 190 may further comprise hard coating layer 140 disposed on the elastic layer.

The hard coating layer 140 may be the hard coating layer applied to displays, and applicable without limit if delamination does not occur in the folding/bending test and the like described below.

The film 190 may further comprise a polarizing layer 360.

The polarizing layer may be disposed under the one side 100a of the elastic layer. In this time, the film 190 may comprise a laminate which is laminated with a polarizing layer 360 and am elastic layer 100. In addition, the film 190 may comprise a laminate which is laminated with a polarizing layer 360, a heat-resisting layer 120, and an elastic layer 100 in order. In this time, between a polarizing layer and an elastic layer, between a polarizing layer and a heat-resisting layer, and/or between a heat-resisting layer and an elastic layer, adhesive layers 130,130' may be disposed. In addition, when the adhesive layer is not disposed as a separated layer, the layers adjoined each other may be bonded by method of melt adhesion (hot-melt).

The film 190 is embodied in accordance with IEC 62715 standard, and delamination phenomenon may not occur in the boundary side laminated with an elastic layer 100 and another layer, after dynamic folding test of 200 thousand times under the condition of the radius of curvature of 2 mm and the folding frequency of 2 sec/time. It means, considering the properties that elasticity in low temperature is relatively lower than elasticity in ambient temperature or high temperature, the elastic layer has excellent elastic qualities even in results of repetitive folding test in a wide temperature range.

The film 190 may have an impact strength of 2500 kJ/m$^2$ or more, an impact strength of 3500 kJ/m$^2$ or more, or an impact strength of 4500 kJ/m$^2$ or more. The film 190 may have an impact strength of 5000 kJ/m$^2$ or more, or an impact strength of 10000 kJ/m$^2$ or less. The film having these characteristics is useful for a cover film because it absorbs an impact from an external well and is not easily broken or impaired.

The film 190 may have an absorbed energy of 1.4 J or more, or an absorbed energy of 1.5 J or more. The film 190 may have an absorbed energy of 1.6 J or more, or an absorbed energy of 2.0 J or less. The film having these characteristics is useful for a cover film because it absorbs well an impact from an external and alleviates the impact being transmitted to an internal, so that protect the film itself to be not easily impaired.

The film 190 may have a difference in yellow indexes measured before and after irradiating ultraviolet rays for 72 hours in 3.0 W at UVB 280 to 360 nm, and the difference may be 2 or less, or less than 1. In addition, the yellow index difference of the film may be 0.8 or less, or 0.6 or less. The yellow index difference of the film may be 0.01 to 0.6, or 0.01 to 0.45. The film having these characteristics may not be yellow even after being exposed to strong ultraviolet and maintain excellent optical properties.

The film 190 may have a haze of 2% or less, or 1% or less. The film may have a haze of 0.8 or less, or 0.7 or less. The film may have a haze of 0.01 or more. The film 190 having these characteristics may have excellent optical properties and transparence.

The use of the film 190 may be a cover window of multi-layered devices.

The use of the film 190 may be a cover layer of display devices.

The cover layer means the layer forming an outward form at least in a part of the device, and functioning to protect interior equipment, not be limited to the one disposed on an outermost part of the device. In particular, when a cover layer is disposed on a display area of the device, it is called as a cover window.

The use of the film 190 may be a cover layer of bendable or foldable multi-layered electronic devices of which a part may be folded.

The use of film 190 may be a cover layer of rollable devices of which a part or all of a device may be rolled or unrolled reversibly.

The film 190 may be included in a protective film of displays.

When the film 190 is applied as a protective film of the displays, it has a suitable level of storage modulus value over a wide temperature range, so has stable bending or flexible qualities over a wide temperature range. Thereby impact transmitted to equipment, which is protected by the elastic layer, can be moderated in an alleviated level.

The film 190 may have excellent durability and recovery force even in repeated bending or flexible environments.

The film 190 may inhibit occurrence of delamination phenomenon in the layer directly in contact with the elastic layer, by applying the elastic layer 100 having a relatively stable storage modulus change in a wide temperature range. Delamination phenomenon may occur due to the difference in modulus between layers that are directly contacting the elastic layer, during repeated bending, folding, etc. The elastic layer has excellent optical properties so that it can be applied to a display and at the same time can control the storage modulus properties to suppress the occurrence of such a delamination phenomenon to a considerable level.

The film 190 is disposed to outside the polarizing layer on the light source, and thus may protect the light emitting layer 320 (display element).

The film 190 may be disposed in a side of a light emitting function layer 300, which include a light emitting layer 320 functioning as light emitting and/or a sensor layer 340 functioning as sensing like a touch sensor in a multi-layered electronic device 900, to protect the light emitting layer 300.

FIG. 4 is a conceptual view illustrating a composition of a multi-layered electronic device with a section, according to embodiments, (a), (b) and (c) of FIG. 5 are conceptual views illustrating a composition of a multi-layered electronic device with sections, respectively, according to embodiments, FIG. 6 is a conceptual view illustrating a composition of a multi-layered electronic device with a section, according to embodiments. Referring to FIG. 4 to FIG. 6, detailed description about a multi-layered device will be made.

Multi-Layered Electronic Device 900

In another embodiment, a multi-layered electronic device 900 includes an elastic layer 100 or a film 190.

The multi-layered electronic device 900 may be a display device, and for example, may be a large area display device, a foldable display device, a bendable display device, or a flexible display device. The multi-layered electronic device 900 may be a bendable mobile communication device such as mobile phone or a bendable laptop computer.

Further detailed information about the elastic layer 100 and the film 190 is omitted since it overlaps with the above description.

The multi-layered electronic device 900 may comprise a film 190 placed on the light emitting function layer 300.

The light emitting function layer 300 includes a light emitting layer 320.

The light emitting layer 320 includes an element which emits light depending on a signal in a display device. The light emitting layer 320 may, for example, include a signal transmitting layer 322, the color-developing layer 324 and an encapsulation layer 326. The signal transmitting layer 322 transmits an electronic signal from an external to the color-developing layer. The color-developing layer 324 is disposed on the signal transmitting layer and develops color depending on a given signal. The encapsulation layer 326 protects the color-developing layer. The signal transmitting layer 322 may comprise a thin film transistor (TFT), and for example, LTPS, a-SiTFT, or Oxide TFT may be applied but not limited thereto. The encapsulation layer 326 may be TFE (Thin Film Encapsulation), but not limited thereto.

The light emitting layer 320 may be disposed on a support layer 380. The support layer 380 may be a layer having insulating qualities and heat resisting qualities, for example may be a polyimide film, a glass layer or so on.

The light emitting function layer 300 may further include a sensor layer 340. The sensor layer 340 may be a touch sensor or so on.

The light emitting function layer 300 may further include a polarizing layer 360. The polarizing layer 360 may be disposed on the light emitting layer 320, or on the sensor layer 340.

In the multi-layered electronic device 900 the elastic layer 100 or the film 190 may be bonded on the light emitting function layer 300.

In the multi-layered electronic device 900 the elastic layer 100 or the film 190 may be applied as use of a cover film so may function as protecting the light emitting layer 320 (display element) In addition, the elastic layer 100 or the film 190 has excellent optical properties, excellent elastic recovery force in a wide temperature range, and excellent durability so that it can suppress the occurrence of such a delamination phenomenon to a considerable level even in repetitive bending or folding processes, thereby it is useful for a window cover or a cover film.

Besides, the elastic layer 100 complements to protecting function (the function of protecting the interior of a cover film from external impact), which has been insufficient with a polyimide film applied as a heat-resisting layer alone. The elastic layer 100 has rolling or bending durability which has been insufficient in conventional glass windows, and maintains protecting function with the same level as a conventional cover window applied with glass, so that it is useful for a cover layer, a protective film of the multi-layered electronic device.

Manufacturing Method of an Elastic Layer 100 or a Film 190

A manufacturing method of an elastic layer 100 according to embodiments includes the steps of: forming an elastic sheet from a polymer resin; and passing the assembly in which the elastic sheet 80 is disposed on a carrier film 92, between rollers, thereby preparing an elastic layer 100.

The polymer resin may include an amide or a residue thereof as a repeating unit.

Detailed description about the repeating unit of the polymer resin, polymerization and so on is omitted since it overlaps with the above description about the elastic layer.

The manufacturing method of a film 190 according to embodiments includes the step of: forming an elastic sheet from a polymer resin; and passing the assembly in which the elastic sheet 80 is disposed on a carrier film 92, between rollers, thereby preparing an elastic layer 100.

When the film 190 includes additional layers that are adhesive layers 130, 130', a heat-resisting layer 120, and/or a polarizing layer 360, the manufacturing method of the film 190 may further include the steps of laminating the elastic layer 100 and the additional layers.

The polymer resin may be an elastomer that forms an amide residue as a repeating unit. The polymer resin may be an elastic polyamide resin or may be a polyether block amide resin. The elastic polyamide resin may be PA11, PA12, PA1012, PA1010, PA610, PA612 and the like. The polyether block amide resin may be PEBAX®, Pebax®, Rnew® from Arkema, VESTAMID® E from Evonik and the like.

The polymer resin may be formed with a sheet shape as an elastic sheet. The method of forming the elastic sheet may be applied if it is a method applied to the production of a film, a melt extrusion method may be applied. When the elastic layer or the film (or laminate) including the same are manufactured by the melt extrusion method, an elastic layer with excellent quality may be more efficiently produced.

When the polymer resin is melt-extruded and molded into a shape of an elastic sheet, the temperature of the melt extrusion may be 200 to 300° C. When a melt extrusion is performed in this temperature range, the polymer resin can be smoothly prepared into a sheet shape by adding fluidity to the polymer resin without impairing the properties of the resin itself.

The elastic sheet 80 may be disposed on the carrier film 92.

The sheet-laminate 90 including the carrier film and the elastic sheet disposed on the carrier film may be processed into an elastic layer 100 in the form of a film through a roller.

The roller may be applied as a first roll 40 and a second roll 60 having the sheet-laminate 90 therebetween, the first roll 40 may be a casting roll and the second roll may be a squeezing roll.

One surface of the sheet-laminate may be in contact with the casting roll, the other surface of the sheet-laminate may be in contact with the squeezing roll and processed to a certain thickness by pressing.

As needed in the processing, the sheet-laminate may further include a sheet-protecting film 94. Specifically, the sheet-laminate may include a carrier film 92, an elastic sheet (or elastic layer) disposed on the carrier film and a sheet-protecting film 94 disposed on the elastic sheet.

The manufacturing method of the elastic layer may provide an elastic layer controlled to have a previously set thickness by preparing an elastic sheet having a constant thickness and passing it between rollers. The method of controlling the thickness of the elastic sheet and the method of controlling the thickness of the elastic layer by passing through the rollers is applicable if the method applied in the film production, and detailed description is omitted. In addition, since the detailed description of the thickness of the elastic layer is the same as described above, the description thereof is omitted.

Surface roughness of the elastic layer may be controlled in the process of passing between the rollers. Surface roughness of one surface of the elastic layer may be controlled by the roughness of the carrier film in direct contact with one surface of the elastic layer. The surface roughness of the other surface of the elastic layer may be controlled by the surface roughness of the squeezing roll in direct contact with the other surface of the elastic layer or the surface roughness of the sheet-protecting film. Since the surface roughness of one surface and the other surface of the elastic layer, the surface roughness of the carrier film, the surface roughness of the sheet-protecting film, the surface roughness of the squeezing roll and the like are same as described above, the description thereof is omitted.

In the method of manufacturing the film, the film may be manufactured in the form of an assembly with a carrier film and the like or the elastic layer itself from which the carrier film is removed.

The method of manufacturing the film may further include removing a carrier film from the assembly as needed.

The method of manufacturing the film may further include disposing an adhesive layer on one surface or the other surface of the elastic layer as needed.

The method of manufacturing the film may further include the steps of disposing a heat-resisting layer on one surface or the other surface of the elastic layer as needed. The heat resisting layer may be a polyimide layer or a glass layer.

The heat-resisting layer may be attached via an adhesive layer disposed directly or separately from the elastic layer.

The method of manufacturing the film may further include a hard coating layer disposed on one surface or the other surface of the elastic layer. The process of forming the hard coating layer may be applied without limitation if it is a method of forming a hard coating layer on the display protective film.

The method of manufacturing the film may further include a polarizing plate disposed on one surface or the other surface of the elastic layer. Between the elastic layer and the polarizing plate, an adhesive layer may be disposed, a heat-resisting layer may be disposed, or the adhesive layer and the heat-resisting layer may be disposed together.

The detailed description of the film, the elastic layer, the use thereof, and the like are the same as described above, and thus description thereof is omitted.

Example embodiments will be explained in more detail with reference to the following examples. However, these examples are merely illustrative to assist in understanding example embodiments and are not intended to limit the scope of example embodiments.

Example: Manufacture of the Elastic Layer and Evaluation of Properties

Preparation of Polymer Resin

Resin applied to the example or the comparative example of the film including an elastic layer was prepared as follows.

PEBA (polyether block amide) resin

Arkema Pebax® 2533 (PEBA Resin 1), Arkema Pebax® 5533 (PEBA Resin 2), Arkema Pebax® 7033 (PEBA Resin 3), Arkema Pebax® Rnew® 55R53 (PEBA Resin 4), Arkema Pebax® Rnew® 63R53 (PEBA Resin 5), Arkema Pebax® Rnew® 70R53 (PEBA Resin 6), Arkema Pebax® Rnew® 72R53 (PEBA Resin 7), Arkema Pebax® Rnew® 80R53 (PEBA Resin 8) and the like were obtained from Arkema France and applied to the following experiment.

PA (Polyamide) resin

PA610 (PA Resin 1), PA612 (PA Resin 1), PA1010 (PA Resin 3), PA1012 (PA Resin 4), PA12 (PA Resin 5), AESNO TL (PA Resin 6), PA11 (PA Resin 7), etc. were obtained from Arkema France and applied to the following experiment.

TPU film, PET film

The 46510 film (Aliphatic TPU) of Argotec was purchased and was applied to TPU. The PET film NRF by SKC Co., Ltd was applied to PET film.

Manufacture of Elastic Layer

After putting into the extruder and melt-kneading, the elastic sheet was extruded into a single layer sheet. At this time, the melt kneading temperature was applied to about 220° C. in the case of PEBA resin 7, and proceeded by adjusting the melt kneading temperature in the range of about 200 to 300° C. according to each resin. The prepared monolayer elastic sheet was placed on a single carrier film (PET film with thickness of 50 μm to 250 μm. Ra of PET film is 0.001 to 0.01 μm) in a continuous process to form an assembly. While the assembly passes between the casting roll and the squeezing roll heated to a temperature of 10 to 120° C., and a laminate including the elastic layer was produced. Thereafter, the elastic layer having a thickness of about 100 μm from which the carrier film was removed was evaluated for properties below with the film of example.

The film produced by the same method and thickness as above without applying a carrier film was evaluated for the properties below with the film of a comparative example.

Evaluation of Properties of the Elastic Layer

1) Evaluation of Storage Modulus

According to ASTM D4065, the storage modulus (E') was evaluated by applying a DMA Q800 model from TA instruments. Table 1 shows the results of measuring the storage modulus (E') in Mpa units at a temperature range (−40 to 80° C.) by applying 1 Hz and 2° C./min in DMA (Dynamic Mechanical Analysis) tension mode using the device. Amplitude of 5 μm was applied and Preforce of 0.01 N was applied.

Along with the above, the results of evaluating the storage modulus by applying the PET film and the TPU film were presented. PET film is an NRF film with thickness of 50 μm manufactured by SKC Co., Ltd, TPU is 46510, which is a monolayer film with thickness of 100 μm manufactured by Argotec.

All sample films were subjected to the above evaluation after conditioning in an atmosphere of 23° C., 50% RH for 15 days.

2) Evaluation of Surface and Optical Properties

Surface roughness was evaluated according to ASTM D4417 standard using SJ-310 model manufactured by Mitutoyo.

Haze was measured according to ISO 14782 standard using a haze meter NDH-7000N manufactured by Nippon Denshoku Co., Ltd.

Y.I (Yellow Index) was measured in YI E313 (D65/10) mode by applying a color meter ultra scanpro manufactured by Hunterlab. When the measured value was 1 or less, it evaluated as Pass, when the measured value was more than 1, it evaluated as Fail.

Y.I of the film before and after exposure to ultraviolet at a power of 3.0 W for 72 hours was measured using a UVB Lamp (SANKYO DENKI G15T8E, wavelength 280~360 nm), then the value that subtract Y.I measured before exposure from Y.I measured after exposure is shown as Delta-Y.I.

3) Evaluation of Recovery Force

An 80 mm×25 mm film was fixed to 15 mm of end of the film by using a jig, and the length of the stressed film was set to 50 mm×25 mm. When 1 cycle was defined as a process consisting of 2% length stretching of the film at a rate of 50 mm/min and restoring to original length at a rate of 50 mm/min, after 100 cycles a tensile test was performed. The length (Xf) between the jig of the film after 100 cycles was measured, and the recovery index was evaluated by following formula 2 compared with the length (Xo, 50 mm) between the jig of an initial film.

$$Rv = \left(\frac{X_{2\%} - Xf}{X_{2\%} - Xo}\right) \times 100 \quad \text{[Equation 2]}$$

Where

Xo is the length of the initial elastic layer (mm), $X_{2\%}$ is the length of the elastic layer after 2% length stretching, Xf is the length (mm) of the elastic layer after 100 cycles when 1 cycle is defined as a process consisting of 2% length stretching at a rate of 50 mm/min and then restoring to original length at a rate of 50 mm/min.

4) Dynamic Folding Test

Dynamic folding test was performed in accordance with IEC 62715-6-1 standard. The film was checked for cracks after dynamic folding test of 200 thousand times under the condition of the radius of curvature of 2 mm and the folding frequency of 2 sec/time at −40° C.

If crack occurs, it evaluated as Fail, if no crack occurs by visual observation, it evaluated as Pass.

TABLE 1

| E' (Mpa) | −40 | 0 | 20 | 40 | 80 |
|---|---|---|---|---|---|
| PA resin 1 | 2211 | 1920 | 1692 | 914 | 327 |
| PA resin 2 | 2109 | 1820 | 1605 | 921 | 306 |
| PA resin 3 | 1652 | 1458 | 1324 | 832 | 249 |
| PA resin 4 | 1510 | 1299 | 1163 | 751 | 193 |
| PA resin 5 | 1365 | 1185 | 1120 | 1050 | 900 |
| PA resin 6 | 1965 | 1762 | 1579 | 1067 | 274 |
| PA resin 7 | 1567 | 1368 | 1260 | 949 | 220 |
| PEBA resin 1 | 238 | 54 | 12 | 11 | 5 |
| PEBA resin 2 | 656 | 214 | 149 | 119 | 73 |
| PEBA resin 3 | 1370 | 843 | 487 | 300 | 170 |
| PEBA resin 4 | 520 | 200 | 142 | 106 | 55 |
| PEBA resin 5 | 1284 | 734 | 463 | 265 | 168 |
| PEBA resin 6 | 1467 | 1087 | 781 | 406 | 210 |
| PEBA resin 7 | 540 | 430 | 374 | 270 | 119 |
| PEBA resin 8 | 600 | 480 | 432 | 360 | 130 |
| Other resin 1 (PET) | 4450 | 4035 | 3889 | 3727 | 3084 |
| Other resin 2 (TPU) | 2356 | 1250 | 480 | 88 | 3 |

| E' (Mpa) | $R_{-40/20}$** | $R_{80/20}$** | $D_{-40-20}$*** | $K_{SM}$* | — |
|---|---|---|---|---|---|
| PA resin 1 | 1.31 | 0.19 | 519 | 100.30 | — |
| PA resin 2 | 1.31 | 0.19 | 504 | 96.09 | — |
| PA resin 3 | 1.25 | 0.19 | 328 | 61.69 | — |
| PA resin 4 | 1.30 | 0.17 | 347 | 57.58 | — |
| PA resin 5 | 1.22 | 0.80 | 245 | 196.88 | — |
| PA resin 6 | 1.24 | 0.17 | 386 | 66.98 | — |
| PA resin 7 | 1.24 | 0.17 | 307 | 53.60 | — |
| PEBA resin 1 | 19.83 | 0.42 | 226 | 94.17 | — |
| PEBA resin 2 | 4.40 | 0.49 | 507 | 248.40 | — |
| PEBA resin 3 | 2.81 | 0.35 | 883 | 308.23 | — |
| PEBA resin 4 | 3.66 | 0.39 | 378 | 146.41 | — |
| PEBA resin 5 | 2.77 | 0.36 | 821 | 297.90 | — |
| PEBA resin 6 | 1.88 | 0.27 | 686 | 184.46 | — |
| PEBA resin 7 | 1.44 | 0.32 | 166 | 52.82 | — |
| PEBA resin 8 | 1.39 | 0.30 | 168 | 50.56 | — |
| Other resin 1 (PET) | 1.14 | 0.79 | 561 | 444.88 | — |

TABLE 1-continued

| | | | | | |
|---|---|---|---|---|---|
| Other resin 2 (TPU) | 4.91 | 0.01 | 1876 | 11.73 | — |

*The storage modulus index $K_{SM}$ is represented by Equation 1 below.
[Equation 1]

$$K_{SM} = \left(\frac{SM_{-40} \times SM_{80}}{SM_{20}}\right) - SM_{80}$$

**The high temperature storage modulus ratio $R_{80/20}$ is expressed by Equation 1-a below.
[Equation 1-a]

$$R_{80/20} = \frac{SM_{80}}{SM_{20}}$$

**The low temperature storage modulus ratio $R_{-40/20}$ is expressed by Equation 1-b below.
[Equation 1-b]

$$R_{-40/20} = \frac{SM_{-40}}{SM_{20}}$$

*** The low temperature storage modulus difference is expressed by Equation 1-c below.
[Equation 1-c]

$$D_{-40-20} = SM_{-40} - SM_{20}$$

Where, $SM_n$ is a storage modulus (Mpa) measured at a temperature of n° C.

TABLE 2

| | Surface roughness of one surface Ra, μm | Surface roughness of the other surface Ra, μm | Haze (%) | Y.I |
|---|---|---|---|---|
| PA resin 7 | 0.0019 | 0.007 | 0.5 | Pass |
| PEBA resin 2 | 0.0023 | 0.012 | 1 | Pass |
| PEBA resin 4 | 0.0021 | 0.01 | 0.8 | Pass |
| PEBA resin 7 | 0.002 | 0.008 | 0.6 | Pass |
| Other resin 1 (PET) | 0.0016 | 0.0018 | 0.4 | Pass |
| Other resin 2 (TPU) | 0.57 | 0.68 | 1.4 | Pass |
| Comparative example | 0.01 to 1 | 0.1 to 2 | 50 to 90 | Pass |

| | delta Y.I | Recovery Index* | Dynamic folding test | |
|---|---|---|---|---|
| PA resin 7 | 0.5 | 60 | pass | — |
| PEBA resin 2 | 0.6 | 88 | pass | — |
| PEBA resin 4 | 0.4 | 82 | pass | — |
| PEBA resin 7 | 0.4 | 75 | pass | — |
| Other resin 1 (PET) | 1.0 | 50 | fail | — |
| Other resin 2 (TPU) | 3.8 | 90 | fail | — |
| Comparative example | 0.5 | 72 | pass | — |

*The recovery index is represented by Equation 2 below.
[Equation 2]

$$Rv = \left(\frac{X_{2\%} - Xf}{X_{2\%} - Xo}\right) \times 100$$

Where Xo is the length of the initial elastic layer (mm), $X_{2\%}$ is the length of the elastic layer after 2% length stretching, and Xf is the length (mm) of the elastic layer after 100 cycles when 1 cycle is defined as a process consisting of 2% length stretching at a rate of 50 mm/min and then restoring to original length at a rate of 50 mm/min.

The length of the elastic layer means the length between the fixed part (jig).

Referring to Table 1 and Table 2, the prepared elastic layers showed a low haze value compared to the elastic layer of the comparative example, which is considered to be related to the value of surface roughness.

In Delta-Y.I, examples using PA or PEBA showed better results compared to other resins. In particular, the results of the examples are excellent results compared to the other resin 1 of PET film, but also excellent results compared to the other resin 2 of TPU. In addition, considering that it is the result of applying the aliphatic TPU, which is known to have superior ultraviolet durability than the aromatic TPU, the films of the examples were evaluated to have excellent ultraviolet durability.

It was confirmed that the dynamic folding test conducted at −40° C. showed that both the other resin 1 and the other resin 2 were evaluated to Fail, and the film of the other resins has insufficient characteristics to be applied for bending or folding in a wide range of temperatures including low temperature.

In recovery index, although there were variations in the properties depending on the resin applied, the examples of PEBA film or PA film showed excellent results, also, PEBA film showed better results than the PA film.

In recovery index, the films of examples showed lower or equivalent properties than those of the other resin 2 to which the TPU film was applied. On the other hand, the results of ultraviolet durability (yellowing properties) and the dynamic folding test at low temperatures showed that the films of the examples are superior to the TPU film.

Considering these properties, it is considered that the elastic layer or the film including the same of the embodiment may have excellent utility in a foldable display in which bending or folding is repeated in a wide temperature range of low temperature to high temperature.

Example: Manufacture of a Film and Evaluation of Properties

Preparing a Film

Production of Specimens of a Cover Film: Commercial OCA manufactured by 3M Co., Ltd having thickness of 100 μm was used as an adhesive layer on a transparent polyimide film (manufactured by SKC Co., Ltd) having thickness of 50 μm. The OCA had a difference ranging −100 to +100 kPa between a storage modulus at −40 deg C. and a storage modulus at +80 deg C. The elastic layer manufactured above (the film manufactured using PEBA resin 7) was laminated on the adhesive layer, thereby producing a specimen of a cover film in Example 1 ((b) structure of FIG. 2).

Specimens of cover films were produced in the same manner as Example 1 but the kinds of the elastic layer is applied as Table 4 below, and designated as Example 2 and Comparative example 1, respectively.

Measurement of the Properties of the Film

1) Evaluation of Tensile-Impact Strength

Tensile-impact strength of the elastic layer was evaluated in accordance with JIS K 7160. Measuring temperature was 23 deg C., 0 50% R.H., and it was applied a pendulum of 4.0 J, a resonance angle of 150 deg when impact strength was measured. Absorbed energy was also measured, and the results were represented in Table 3 below.

2) Folding/Bending Test and Pen-Drop Test of the Film that is a Laminate

Dynamic Folding Test: Using specimens of a cover film in accordance with IEC 62715-6-1 standard, test of 200 thousand times was carried out under the condition of the radius of curvature of 2 mm and the folding frequency of 2 sec/time. If delamination occurred, it was marked as X, and if delamination did not occur, it was marked as O. The result was represented in Table 4 below.

Static Bending Test: Using specimens of a cover film in accordance with IEC 62715-6-1 standard, test was carried out under the condition of the radius of curvature of 2 mm. After 24 hours if delamination occurred, it was marked as X, and if delamination did not occur, it was marked as O. The result was represented in Table 4 below.

Pen-drop Test: When a pen was dropped in the height of 9 cm to film samples that are laminates, it was evaluated as Pass if the film sample was good and evaluated as Fail if the film sample was broken.

Transmittance/Haze: Transmittance and haze were evaluated by NDH7000 (manufactured by Nippon Denshoku Co., Ltd). It was evaluated as Pass if haze was 1% or less and evaluated as Fail if haze was greater than 1%. Transmittance was evaluated as Pass if transmittance in visible light was 90% or more, and evaluated as Fail if transmittance in visible light was less than 90%.

TABLE 3

|  | Impact Strength (kJ/m²) | Absorbed energy (J) |
|---|---|---|
| Other Resin 1(PET) | 2900 | 1.43 |
| Other Resin 2(TPU) | 1900 | 1.05 |
| PEBA resin 7 | 5400 | 1.66 |

TABLE 4

| Structure of Film-laminate | | Example 1<br>PEBA resin 7<br>layer +<br>Adhesive<br>Layer + PI<br>Film | Example 2<br>TPU layer +<br>Adhesive<br>Layer + PI<br>Film | Comparative<br>Example 1<br>PET layer +<br>Adhesive<br>Layer + PI<br>Film | Comparative<br>Example 2<br>PI Film<br>Alone |
|---|---|---|---|---|---|
| Dynamic | −40 deg C. | Pass | Fail | Fail | — |
| Folding Test | 80 deg C. | Pass | Pass | Fail | — |
| Static Bending | −40 deg C. | Pass | Pass | Fail | — |
| Test | 80 deg C. | Pass | Pass | Fail | — |
| Pen-drop Test | 9 cm | Pass | Pass | Pass | Fail |
| Transmittance (%) | | Pass | Pass | Pass | Pass |
| Haze (%) | | Pass | Pass | Pass | Pass |

Referring to Table 3, the impact strength of an example film applied with PEBA resin 7 was significantly higher than the impact strength of the film applied with other resin 2 (TPU) or the impact strength of the film applied with other resin 1 (PET), so it is verified that the example film has properties that were very strong to impact. Absorbed energy was also significantly excellent in the example film applied with PEBA resin 7, rather than in the film applied with other resin 2 (TPU) or in the film applied with other resin 1 (PET).

It is shown that TPU is superior to PET in storage modulus related properties, but TPU is inferior to PET in tensile-impact strength. At the same time, the result in Table 3 show that the film applied with PEBA is superior in storage modulus properties and tensile-impact strength both.

Referring to Table 4, the laminate of Example 1 applied with PEBA resin 7 produced above was rated as the superior in all measured properties because it got Pass in all performed evaluations such as dynamic folding test in high and low temperature, static bending test in high and low temperature, pen-drop test, transmittance and haze. Contrarily, Example 2 applied with the same adhesive layer and PT film as Example 1 but applied with TPO instead of PEBA resin 7 was evaluated as Fail in dynamic folding test in low temperature despite other properties were all good, so delamination and the like might occur when repetitive folding occurred. While, Comparative example 1 applied with PET was evaluated as Fail in all the dynamic and static folding/bending test, so it was rated as having properties not suitable for applying as bendable or rollable cover films. Comparative example 1 showed the result of tests for polyimide film alone, and evaluated as Fail in pen-drop test, so polyimide film alone was rated as what couldn't get impact-protecting effect applicable for cover films.

Hereinabove, the preferred embodiments of the present disclosure have been explained in detail, but the scope of the present disclosure should not be limited thereto, and various modifications and improvements made by a person of ordinary skill in the art with using a basic concept defined by the following claims should also be construed to belong to the scope of the present disclosure.

(DESCRIPTION OF FIGURE NUMBERS)

| | |
|---|---|
| 100: elastic layer | |
| 100a: one surface of an elastic layer | 100b: the other surface of an elastic layer |
| 120: heat-resisting layer | 130, 130': adhesive layer |
| 140: hard coating layer | 150: release film |
| 80: elastic sheet | 92: carrier film |
| 94: sheet-protecting film | 40: first roll, casting roll |

-continued (DESCRIPTION OF FIGURE NUMBERS)

| | |
|---|---|
| 60: second roll, squeezing roll | 90: sheet-laminate |
| 190: film, film-laminate | 300: light emitting function layer |
| 320: light emitting layer | 322: signal transmitting layer |
| 324: color-developing layer | 326: encapsulation layer |
| 340: sensor layer | 360: polarizing layer |
| 380: support layer | 900: multi-layered electronic device |

The invention claimed is:

1. A film, comprising:
an elastic layer,
wherein the elastic layer has a storage modulus index $K_{SM}$ of 20 to 350 Mpa represented by Equation 1 below, and
wherein the elastic layer has a haze of 3% or less;

$$K_{SM} = \left(\frac{SM_{-40} \times SM_{80}}{SM_{20}}\right) - SM_{80} \qquad \text{[Equation 1]}$$

where $SM_{-40}$ is a storage modulus (Mpa) measured at a temperature of −40° C., $SM_{80}$ is a storage modulus (Mpa) measured at a temperature of 80° C., and $SM_{20}$ is a storage modulus (Mpa) measured at a temperature of 20° C., wherein the elastic layer comprises a polymer which has an amide residue as a repeating unit, wherein a low temperature storage modulus ratio R-40/20 is a ratio of the storage modulus at −40° C. based on the storage modulus at 20° C. and the low temperature storage modulus ratio R-40/20 of the elastic layer is 1.33 or more, and wherein the storage modulus of the elastic layer at −40° C. is 2000 Mpa or less.

2. The film according to claim 1,
wherein the elastic layer has a storage modulus of 3 GPa or less at ambient temperature.

3. The film according to claim 1,
wherein the elastic layer has a storage modulus ratio of 0.08 or more, which is the ratio of a storage modulus at 80° C. based on a storage modulus at 20° C.

4. The film according to claim 1,
wherein the elastic layer has a difference of a storage modulus at −40° C. and a storage modulus at 20° C., and the difference of a storage modulus ranges from −1500 to +1500 MPa.

5. The film according to claim 1,
wherein the elastic layer has a storage modulus of 20 to 2500 Mpa at 0° C.

6. The film according to claim 1,
wherein the elastic layer has a storage modulus of at least 5 Mpa or more at 80° C.

7. The film according to claim 1,
wherein a thickness of the elastic layer is less than 2000 μm.

8. The film according to claim 1,
wherein a recovery force index Rv is represented by Equation 2 below, and the Rv of the elastic layer is greater than 50;

$$Rv = \left(\frac{X_{2\%} - Xf}{X_{2\%} - Xo}\right) \times 100 \quad \text{[Equation 2]}$$

where Xo is a length (mm) of the initial elastic layer, $X_{2\%}$ is a length (mm) of the elastic layer after 2% length stretching, and when 1 cycle is defined as a process consisting of 2% length stretching at a rate of 50 mm/min and restoring to original length at a rate of 50 mm/min, Xf is a length (mm) of the elastic layer after 100 cycles.

9. The film according to claim 1,
wherein the elastic layer is an elastomer film comprising a polyether block amide.

10. The film according to claim 9,
wherein a content of polyamide contained in the polyether block amide is at least 50 wt % or more based on the total polyether block amide.

11. The film according to claim 1,
wherein the elastic layer has a storage modulus ratio of 0.20 or more and 0.7 or less, which is the storage modulus ratio of a storage modulus at 80° C. based on a storage modulus at 20° C.

12. The film according to claim 11,
wherein a storage modulus of the elastic layer at 0° C. is 20 Mpa or more.

13. The film according to claim 11,
wherein the storage modulus of the elastic layer at −40° C. is 400 Mpa or more.

14. The film according to claim 1,
wherein the low temperature storage modulus ratio R-40/20 of the elastic layer is 4.5 or less.

15. A cover film comprising a film according to claim 1.

16. A multi-layered electronic device comprising a film according to claim 1 as a cover film.

17. The multi-layered electronic device according to claim 16,
wherein the multi-layered electronic device comprises a light emitting function layer and the cover film,
wherein the light emitting function layer has a display area which emits or does not emit a light depending on a signal from an outside of the device, and
wherein the cover film is disposed on one surface of the lighting emitting function layer and covers at least a part of the display area.

* * * * *